US009305362B1

(12) United States Patent
Szedo et al.

(10) Patent No.: US 9,305,362 B1
(45) Date of Patent: Apr. 5, 2016

(54) IMAGE STABILIZATION

(71) Applicant: Xilinx, Inc., San Jose, CA (US)

(72) Inventors: Gabor Szedo, Broomfield, CO (US); Christopher J. Martin, Pflugerville, TX (US); Ted N. Booth, Sellersville, PA (US)

(73) Assignee: XILINX, INC., San Jose, CA (US)

( * ) Notice: Subject to any disclaimer, the term of this patent is extended or adjusted under 35 U.S.C. 154(b) by 126 days.

(21) Appl. No.: 14/194,519

(22) Filed: Feb. 28, 2014

(51) Int. Cl.
*G06T 7/20* (2006.01)
*G06K 9/00* (2006.01)
*G06T 7/00* (2006.01)

(52) U.S. Cl.
CPC .............. *G06T 7/20* (2013.01); *G06K 9/00624* (2013.01); *G06T 7/0079* (2013.01)

(58) Field of Classification Search
None
See application file for complete search history.

(56) References Cited

U.S. PATENT DOCUMENTS

| 5,742,710 | A * | 4/1998 | Hsu | G06T 7/2026 375/E7.107 |
| 6,148,027 | A * | 11/2000 | Song | H04N 19/61 375/240 |
| 2007/0036408 | A1 * | 2/2007 | Kim | G06T 7/0028 382/128 |
| 2009/0092284 | A1 * | 4/2009 | Breed | B60J 10/00 382/103 |

OTHER PUBLICATIONS

Batur, Aziz Umit, et al., "Video Stabilization With Optimized Motion Estimation Resolution", Digital Signal Processing R&D Center, Texas Instruments, Dallas, TX, pp. 465-468, 2006.

Cardani, Brant, "Optical Image Stabilization for Digital Cameras", IEEE Control Systems Magazine, Apr. 2006, pp. 21-22.
Cucka, Peter, et al., "Qualitative Description of Camera Motion and Scene Depth from Histograms of Normal Flow", Computer Vision Laboratory, Center for Automation Research University of Maryland, Sep. 1998, pp. 1-18.
Erturk, S. "Digital Image Stabilization with Sub-Image Phase Correlation Based Global Motion Estimation", IEEE Transaction on Consumer Electronics, vol. 49, No. 4, Nov. 2003, pp. 1320-1325.
Okuda, Haruhisa, et al., "Optimum Motion Estimation Algorighm for Fast and Robust Digital Image Stabilization", IEEE Transaction on Consumer Electronics, vol. 52, No. 1, Feb. 2006,pp. 276-280.
Shimizu, Masao, et al., "Precise Simultaneous Estimation of Image Deformation Parameters", Graduate School of Science and Engineering, Tokyo Institute of Technology, Proceedings of the 2004 IEEE Computer Society Conference on Computer Vision and Pattern Recognition Workshops, (CVPRW'04), Jun. 27-Jul. 2, 2004, 8 pgs., Washington, D.C. US.

(Continued)

*Primary Examiner* — Siamak Harandi
(74) *Attorney, Agent, or Firm* — W. Eric Webostad

(57) ABSTRACT

A method relating generally to image processing is disclosed. In such a method, an image is preprocessed for noise suppression and edge detection with filters. The image is hierarchically decomposed to provide an image pyramid. The hierarchical decomposition includes successively down-scaling the image to provide different resolutions of the image corresponding to levels of the image pyramid. The image and the different resolutions of the image provide a set of images. A scene analysis of the set of images is performed. The performing of the scene analysis includes determining qualifications of blocks of the set of images for feature tracking. A subset of the blocks determined to be qualified for the feature tracking is selected. Motion estimation is performed on the subset of the blocks. The motion estimation is performed using a hierarchical set of motion estimation engines corresponding to levels of the image pyramid.

20 Claims, 12 Drawing Sheets

(56) References Cited

OTHER PUBLICATIONS

Vello, Filippo et al., "Digital Image Stabilization by Adaptive Block Motion Vectors Filtering", IEEE Transactions on Consumer Electronics, vol. 48, No. 3, Aug. 2002, pp. 796-801.

Xu, Lidong, et al., "Digital Image Stabilization Based on Circular Block Matching", IEEE Transaction on Consumer Electronics, vol. 52, No. 2, May 2006, pp. 566-574.

Yeni, A. Aysun et al., "Fast Digital Image Stabilization using One Bit Transform Based Sub-Image Motion Estimation", IEEE Transaction on Consumer Electronics, vol. 52, No. 3, Aug. 2005, pp. 917-921.

\* cited by examiner

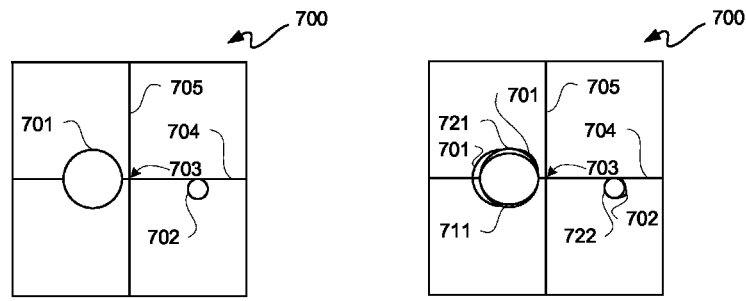
FIG. 7A  FIG. 7B
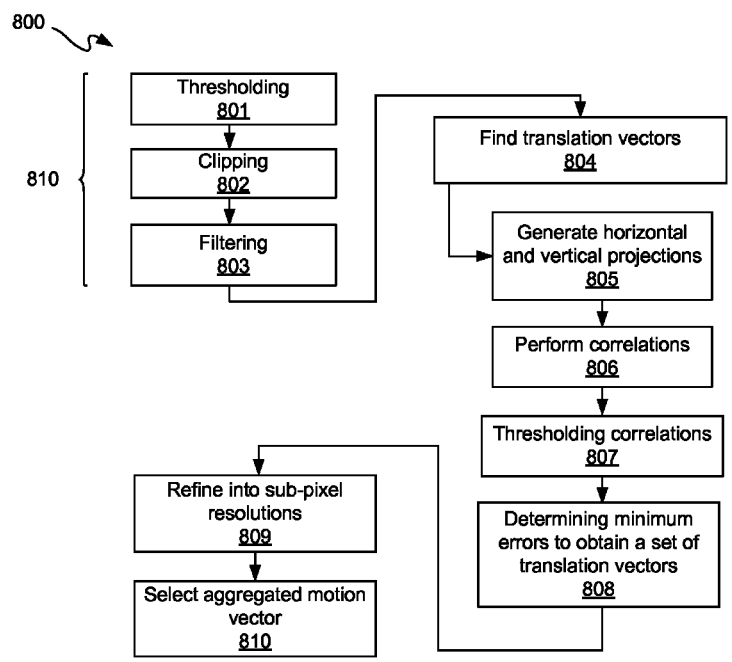
FIG. 8

IMAGE STABILIZATION

FIELD OF THE INVENTION

The following description relates to integrated circuit devices ("ICs"). More particularly, the following description relates to image stabilization for ICs.

BACKGROUND

Conventionally, a video stream recorded using an image sensor, such as in a camera, may suffer from motion of: an operator of the camera, a support structure of a camera, and/or an object being recorded with a camera. Unwanted motion may lead to an unpleasant viewing experience, an adverse impact on video compression efficiency, and/or a hindrance with video analytic and/or security applications. This unwanted motion may be a translation motion, such as due to vibration and/or jitter (hereinafter collectively and singly "translational jitter"), parallel to an X, Y plane of an image sensor. Undesired motion of a camera or other device with an image sensor may lead to introduction of artifacts, shaking, motion blur, and/or distortion of contours of rigid objects in a captured image. This undesired motion may thus lead to a reduction in image quality.

Motion in or of an image may be local or global, respectively. Pixel-based motion vectors (i.e., optical flow) may be determined from changes in pixel values in an image with analysis of configuration, such as by segmentation, of a scene in such image, and/or individual motion parameters of scene components. Other contributors to motion vectors may include: intended global motion (e.g., camera panning), unintended global motion (e.g., jitter and/or oscillations), background motion (e.g., motion in an x-axis, y-axis, and/or z-axis (e.g., a camera mounted on a moving vehicle), rigid object motion (e.g., translation and/or rotation), and/or non-rigid object motion (e.g., waves and/or mist). Unfortunately, prior conventional image stabilization in high-bandwidth video recording devices has been quite complex.

Accordingly, it would be desirable to provide image stabilization for video recording that is less complicated than in the past.

SUMMARY

A method relates generally to image processing. In such a method, an image is preprocessed for noise suppression and edge detection with filters. The image is hierarchically decomposed to provide an image pyramid. The hierarchical decomposition includes successively down-scaling the image to provide different resolutions of the image corresponding to levels of the image pyramid. The image and the different resolutions of the image provide a set of images. A scene analysis of the set of images is performed. The performing of the scene analysis includes determining qualifications of blocks of the set of images for feature tracking. A subset of the blocks determined to be qualified for the feature tracking is selected. Motion estimation is performed on the subset of the blocks. The motion estimation is performed using a hierarchical set of motion estimation engines corresponding to levels of the image pyramid.

Another method relates generally to image processing. In such a method, an image is preprocessed for noise suppression and edge detection. The image is hierarchically decomposed to provide an image pyramid. The hierarchical decomposition includes successively down-scaling the image to provide different resolutions of the image corresponding to levels of the image pyramid. The image and the different resolutions of the image provide a set of images. A scene analysis of the set of images is performed. The performing of the scene analysis includes determining variance values for blocks of the set of images. A subset of the blocks is selected based on variance qualifier values in excess of a variance qualifier threshold providing a subset of variance values. The subset of variance values is stored in association with ones of the set of images corresponding thereto in a frame buffer. Motion estimation is performed on the subset of variance values with a plurality of motion estimation engines to determine motion vectors for translation of the blocks corresponding to the subset of variance values in a reference frame to a current frame. The selecting of the subset of variance values includes first dynamic thresholding of the variance qualifier values. Errors associated with the motion vectors are determined with the motion estimation engines. Second dynamic thresholding responsive to the errors is used to provide a subset of the motion vectors. An apparatus relates generally to image processing. In such an apparatus, a preprocessing block is configured for noise suppression and edge detection of an image. An image pyramid generator block is configured for hierarchical decomposition of the image to provide an image pyramid. The hierarchical decomposition is a successively down-scaled version of the image to provide different resolutions of the image corresponding to levels of the image pyramid. The image and the different resolutions of the image provide a set of images. A scene analysis section is configured to perform a scene analysis of the set of images. The scene analysis section is configured to determine variance values for blocks of the set of images. The scene analysis section is configured to select a subset of the variance values in excess of a variance qualifier threshold. A frame buffer is coupled to store the subset of the variance values in association with the set of images corresponding thereto.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 7A is a graphical diagram depicting an exemplary 2D histogram of motion vectors.

FIG. 7B is a graphical diagram depicting the exemplary 2D histogram of motion vectors of FIG. 7A after rendering.

FIG. 8 is a flow diagram depicting an exemplary motion vector processing flow, such as may be used for a vector processing module of FIG. 1.

DETAILED DESCRIPTION

Figure 1:
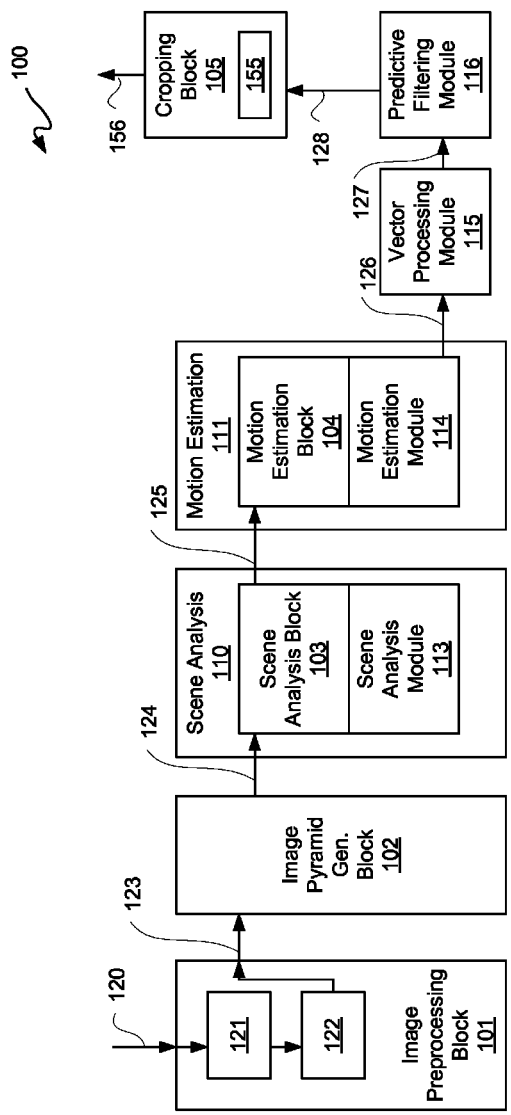
FIG. 1 is schematic diagram depicting an exemplary video stabilization system ("video stabilizer").

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Generally, for image stabilization, a set of image feature points ("feature points") in images in adjacent frames are compared to determine any change in position between such feature points. Identification of what objects may be reliably used for this comparison is relevant to image stabilization for a recording sequence. Edges and corners of objects may be selected for correspondence between neighboring frames, and displacement or motion vectors associated with differences between such corresponding objects may be analyzed. For example, some of such feature points may have moved a substantial amount leading to large variances, and some of such feature points may not have substantially changed leading to small variances. If these two types of feature points are binned into large variances and small variances, then in a sequence of frames these two groups may be relatively stable with small or incremental movements. Such incremental movements may be associated with a camera shaking during capturing images for such sequence of frames, namely translational jitter. The following description, apart from cropping, is generally directed at identification of such superimposed incremental movements.

Generally, a video stabilization system involves an image feature identification portion and an image feature tracking portion. In the feature identification portion, the general idea is to identify those features which would be good to track for purposes of tracking for adjusting for translational jitter. Features that may be useful to track may be more unique than other features in an image, such that those features may be specifically identified in multiple frames. For example, suppose the image is a white square on a black background, corners of such square may be useful for purposes of tracking while the black background or white interior of such cube may not be useful for purposes of tracking. In other words, corners of such square may be uniquely identifiable, namely they stand out, in a sequence of images of such square. Straight edges generally are not as useful for feature tracking as corners, as multiple positions alongside an edge can have identical localities, and so corners may be more uniquely identified than edges of such a cube.

As described below, translational jitter may be measured, and such measured translational jitter may be compensated for to enhance quality of a captured image. Global frame jitter may be measured by video analytics, which may be entirely electronic, and such measured global frame jitter may be compensated for electronically. Such measurement and compensation may be implemented in a VLSI device, including without limitation an FPGA, ASIC, ASSP, DSP, or other VLSI SoC device. Along those lines, In-System Programming ("ISP") within an embedded programmable logic device, microcontroller, processor or other embedded device may be used. As described below in additional detail, video stabilization is provided which is capable of handling high-speed applications with a low amount of circuitry overhead. Additionally, for cropping and then scaling an image, there is a limit to the amount of cropping that may be done. Along those lines, for motion estimation, a feature point in one frame is to be found in an adjacent frame within a specified radius, for translational jitter this radius may be defined by x-axis and/or y-axis movement.

Along the above lines, for example, an image may be preprocessed for noise suppression and edge detection with filters. The image may be hierarchically decomposed to provide an image pyramid. The hierarchical decomposition may include successively down-scaling the image to provide different resolutions of the image corresponding to levels of the image pyramid. The image and the different resolutions of the image may provide a set of images. A scene analysis of the set of images may be performed. The performing of the scene analysis may include determining qualifications of blocks of the set of images for feature tracking for motion estimation. For example, variance values of the blocks may be determined for determine such fitness of the blocks. A subset of the blocks determined to be qualified for such feature tracking may be selected. Motion estimation may be performed on such subset. Such motion estimation may be performed by a hierarchical set of motion estimation engines corresponding to levels of the image pyramid. Resulting block based motion vectors may be aggregated into a two-dimensional motion histogram. Using a multi-stage optimization process, a translation vector may be established which minimizes difference (error) between the last captured motion histogram and a temporal filtered stack of past matched motion histograms. Each such translation vector may be accumulated to be used for translating an entire video frame for purposes of video stabilization. Each such accumulated translation vector may be post-processed with an adaptive filter to reduce artifacts caused by large camera motion.

With the above general understanding in mind, various configurations for motion compensation by global frame jitter measurement with video analytics for motion estimation and motion vector aggregation are generally described below.

FIG. 1 is schematic diagram depicting an exemplary video stabilization system ("video stabilizer") 100. Video stabilizer 100 may be implemented with less than two million gates for supporting high-speed video applications. More particularly, video stabilizer 100 includes an image preprocessing block 101, an image pyramid generation block 102, a scene analysis block 103, a motion estimation block 104, a cropping block 105, a scene analysis module 113, a motion estimation module 114, a vector processing module 115, and a predictive filtering module 116. Video stabilizer 100 may be configured for pipelined operation though clocking and register stages; however, such pipelining is not illustratively depicted for purposes of clarity and not limitation.

In this example, blocks 101 through 105 are components implemented in hardware, and modules 113 through 116 are components implemented in software. In particular, scene analysis section 110 of video stabilizer 100 is parsed into a hardware scene analysis block 103 and a software scene analysis module 113, and motion estimation section 111 is parsed into a hardware motion estimation block 104 and a software motion estimation module 114. In this example, software modules are used to process metadata produced by hardware blocks. However, in other examples, all blocks and modules may be implemented in either hardware or software, or some other combination of hardware and/or software may be used. For purposes of clarity by way of example and not limitation, the following description assumes that the configuration of this example of video stabilizer 100 is used, as any of the above-mentioned configurations of a video stabilizer follow from such description.

Generally, video stabilizer 100 is configured to process streaming video with a limited bandwidth to access external memory. Video stabilizer 100 is configured to measure global jitter, such as due to shaking for example, by analyzing frame-to-frame motion of N-by-N image blocks. Even though square blocks are described herein for purposes of clarity by way of example, other rectangular blocks or polygons may be used. For purposes of clarity by way of example, it shall be assumed that N is equal to 16, namely 16 pixels, even though other values may be used. In this example implementation, RGB video frames can be processed by the architecture of video stabilizer 100. In other embodiments, the same architecture may be used to process YUV data with 3 or 2 channels, as well as luminance only (i.e., grayscale) data. Generally, multichannel ("color") video data may be written to an external frame buffer coupled to video stabilizer 100 and, at the same time or in parallel, luminance data 120 of the same pixels of such color video data may be provided to image preprocessing block 101.

In order to reduce power consumption and complexity, not all blocks of a video frame need be processed for motion processing. Some image blocks contain very little intrinsic information, e.g. blocks pertaining to clear blue skies are very similar to one another, making them poor candidates for a motion search. Along those lines, before analyzing an image scene for suitable blocks thereof for motion detection, noise may be suppressed and edges in such image scene may be enhanced. Image preprocessing block 101 may be used for noise suppression and edge detection in images in video frames. In this example, image preprocessing block 101 is configured to perform a Laplacian of Gaussian ("LoG") function. A Gaussian filter 121 of block 101 may be applied to suppresses noise in an image in luminance data 120, and such luminance data 120 with some degree of noise suppression may then be input to a Laplacian filter 122.

An example of a Gaussian filter kernel that may be used may mathematically be defined as:

$$k_{i,j} = \frac{1}{s} e^{-\frac{(R-i)^2 \mp (R-j)^2}{R^2}},$$

$$i, j \in 1 \ldots 2R,$$

where a normalization factor $s^{-1}$ may be used to ensure that:

$$\Sigma_{i=1}^{2R} \Sigma_{j=1}^{2R} k_{i,j} = 1.$$

Increasing kernel radius R may result in more severe low-pass filtering and loss of high frequency image detail, and a Gaussian filter for R>2 may produce relatively little gain in noise suppression, but significant loss of edge detail. Accordingly, a Gaussian filter kernel radius R equal to 1 or 2 may be used in this example. There may be some differences between these two implementations. For example, while an R equal to 1 Gaussian filter kernel radius may be implemented without any multipliers, an R equal to 2 Gaussian filter kernel radius may provide better noise immunity at the expense of parallel multipliers in an FPGA implementation.

Once noise has been removed, differences in intensity may be identified. In this example, a 3-by-3 Laplacian filter kernel may be used; however, other Laplacian filter kernels may be used in other implementations for edge detection. Generally, a Laplacian filter 122 that effectively calculates or otherwise determines a second discrete derivative of an image associated with noise suppressed luminance data to equalize gray levels and enhance or detect edges of such image may be used. In other words, a Laplacian filter may be used to identify contours in an image, namely where large swings, positive or negative, in intensity occur, and to filter out a remainder.

Output 123 of such a LoG filter, or more generally output of image preprocessing block 101, may be provide as input to image pyramid generation block 102, and output 124 of image pyramid generation block 102 may be provided to scene analysis section 110. So input to image pyramid generation block 102 may be a contours-only, sensor noise filtered image.

Generally, scene analysis section 110 may calculate or otherwise determine variances for all blocks making up an image, namely block-based variance at different image resolutions as calculated by block 102. Variances at different image resolutions may be combined into a single qualifier pertinent to blocks at a highest image resolution level. Blocks with low variance values are discarded, and only those blocks with a sufficiently high variance are selected for a motion search, such as for motion estimation. Generally, at this selection stage, corners and edges, as well as other features with high enough variances, may be passed on for motion estimation.

As described in additional detail below, motion estimation is performed hierarchically, using an image pyramid generated by image pyramid generation block 102. For example, a feature point having a sufficiently high variance for passing through scene analysis section 110 may be tracked from one frame to another frame, and this tracking may respectively occur at one or more levels of an image pyramid. Again, this is done at a block-by-block basis, and so a block or blocks associated with such feature point may be tracked from frame-to-frame.

In this example, image pyramid generation block 102 progressively down-scales copies of an image in a video frame. To select image regions where a motion search is more likely to lead to low-error, high-quality motion vectors, block-based variance may be calculated or otherwise determined for an original resolution of an image, as well as each of the down-scaled copies thereof, forming an image pyramid. Generally, variance may be determined for all image blocks for each pyramid level. However, there may be error due to introduction of a change in lighting, occlusion, distortion, noise, and/or other error inducing cause in a frame.

Output 125 of scene analysis section 110 may be provided to motion estimation section 111. A feature point is more likely to be tracked in two or more frames if the error is low due to uniqueness of such feature point. As described below, a best match or lowest error may be determined for a tracked block, and a second best match or second lowest error may be determined for tracked blocks. If there is a large difference between magnitude of the lowest error and the second lowest error of such tracked block, then confidence is high that the feature being tracked is the same between frames. However, if there is only a small difference between the magnitude of a lowest error and a second lowest error for such tracked block, then such tracked block may not be sufficiently unique to be sufficiently useful for video stabilization. In other words, subsequent processing of such a less unique block may not merit the overhead, whether in complexity, storage size and/or bandwidth consumed, associated with such processing. Thus, rather than having a large VLSI device with a complex structure, it should be understood that a less complex device is provided herein in various discrete sections. Furthermore, with dynamic thresholding, as described below in additional detail, a small set of feature points contained in image blocks may be used for vector processing for video stabilization. Generally, for an example described hereinbelow, dynamic thresholding for screening of variances or motion vectors is performed in software; however, in other implementations hardware may be used for such screening.

Output 126 of motion estimation section 111 may be provided to vector processing module 115. Vector output 127 of vector processing module 115 may be provided to predictive filtering module 116. Output 128 of predictive filtering module 116 may be provided to a scaling and/or cropping ("cropping") block 105. Cropping block 105, which may include an adaptive filter 155 for cropping, may be configured for cropping on a sub-pixel basis. Output of cropping block 105 may be stabilized video frames 156.

Accordingly, an architecture with dedicated hardware blocks for performing pre-processing, image pyramid construction, scene analysis, motion estimation, and cropping/scaling is provided. These parsed-dedicated hardware blocks facilitate pipelining for throughput, as well as efficiency in hardware overhead.

Figure 2:
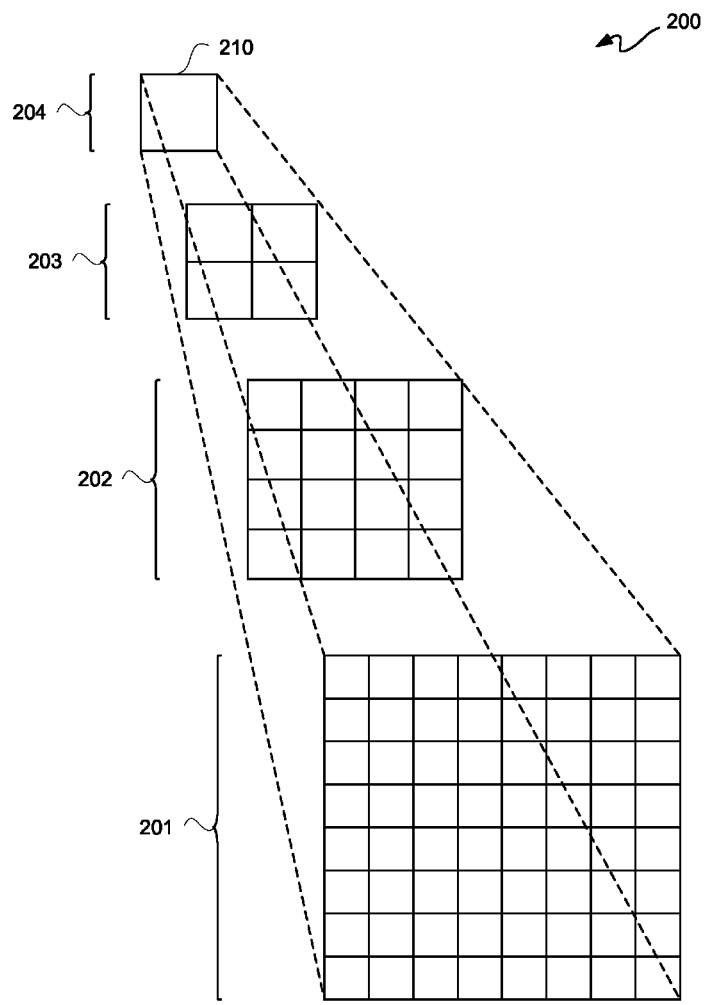
FIG. 2 is a perspective block diagram depicting an exemplary hierarchical decomposition of an image to provide an image pyramid.

FIG. 2 is a perspective block diagram depicting an exemplary hierarchical decomposition of an image to provide an image pyramid 200. An initial layer, namely Layer 0, of image pyramid 200 may be a full resolution of an image. In this example, Layer 0 is a bottom layer 201 of image pyramid 200. A next or subsequent layer 202 up from such bottom layer 201, namely Layer 1, is a down-scaled version of layer 201. A next or subsequent layer 203 up from layer 202, namely Layer 2, is a down-scaled version of layer 202. A next or subsequent layer 204 up from layer 203, namely top Layer 3, is a down-scaled version of layer 203. Effectively, hierarchically decomposing an original resolution of an image may include successively down-scaling an image to provide images at different resolutions of the image corresponding to levels of an image pyramid 200. Along those lines, the image, and the different resolutions of such image, may provide a set of images corresponding to resolution levels or resolutions of image pyramid 200.

In this example, layer 201 is an 8-by-8 block layer. Layer 202 is a binary down scaled version of layer 201, and so layer 202 is layer 201 shrunk down by a factor of two, along both x and y axes to a 4-by-4 block layer. Likewise, layer 203 is a binary down scaled version of layer 202, and so layer 203 is layer 202 shrunk down by a factor of two, along both x and y axes, to a 2-by-2 block layer. Lastly, in this example, layer 204 is a binary down scaled version of layer 203, and so layer 204 is layer 203 shrunk down by a factor of two, along both x and y axes, to a 1-by-1 block layer. Accordingly, each block on a highest resolution layer or level may be compressed or collapsed down to a single pixel on a lowest resolution layer or level. This is just an example of an image pyramid 200, and these, or other numbers of blocks per level and/or number of levels may be used in other implementations. Along those lines, it should be appreciated that there is a minimal, if any, amount of information for motion estimation that may be obtained from a 1-by-1 or 2-by-2 pixel block. In this example, each block, such as block 210, represents 16-by-16 pixels; however, in other configuration fewer or more pixels may be associated with a block.

Figure 3:
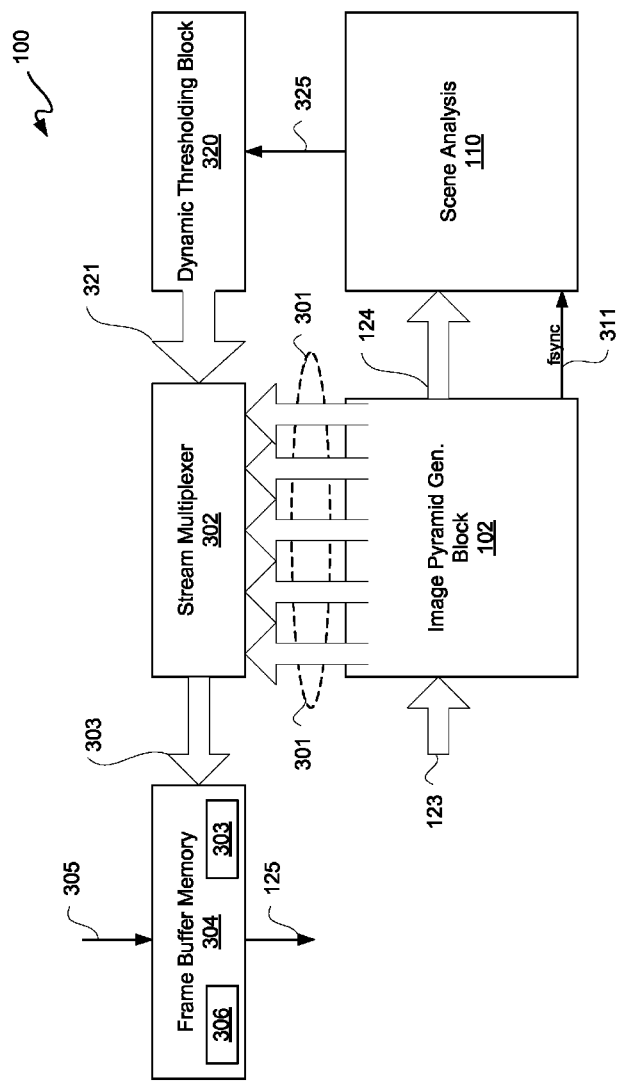
FIG. 3 is a block diagram depicting an exemplary preprocessing-pyramid-analysis portion of video stabilizer.

FIG. 3 is a block diagram depicting an exemplary preprocessing-pyramid-analysis portion of video stabilizer 100. Generally, part of a motion estimation process is to determine a motion vector for an image block in a frame and reliably find such image block in a next frame, for comparison of motion vectors of each of such blocks. Another part of a motion estimation process is generally to determine which blocks to use for motion estimation and how to use them. With this general understanding borne in mind, FIGS. 1 through 3 are further simultaneously described.

Output 123 is provided as input to image pyramid generation block 102, which outputs a plurality of resolutions or levels 301 of an image from an image pyramid 200. Generally, a color or grayscale image may be input to image preprocessing block 101, and image processing block 101 may output a black and white, or grayscale, image of only contours of an image as output 123. Thus, motion estimation need not be performed on a plurality of color channels to reduce complexity. In this example, there are five resolutions 301, which are successively down-scaled resolutions of an original image; however, in other implementations there may be fewer or more than five resolutions. For example, suppose an image is of a black and white checkerboard, even though variance of a block may be high at a higher resolution, such variance may be practically non-existent at a lower resolutions. Thus, such block may not be used for localization of motion at each level of an image pyramid, even though it may have a high variance at a higher resolution level. Therefore, scene analysis may be used to determine variance of a block at all levels of an image pyramid, and such variances may be aggregated to provide an aggregated variance for such block.

Each of these resolutions 301 may be provided in parallel from image pyramid generation block 102 to a stream multiplexing bus ("stream multiplexer") 302. Output of selected downscaled images 303 of stream multiplexer 302 may be provided to a frame buffer memory 304. Frame buffer memory 304 may be coupled to stream multiplexer 302 through a Video Direct Memory Access ("VDMA") core instantiated in programmable logic in an FPGA implementation; however, other types of circuitry may be used for such coupling in other implementations. A VDMA core may provide high-bandwidth direct memory access ("DMA") for video streams for two-dimensional DMA operations. In an implementation, an AXI VDMA may be used with an AXI4 stream protocol for video stream multiplexing; however, in other implementations other stream protocols may be used. By high-bandwidth, it is generally meant capable of handling high-definition or HD video, 1920×1080 progressive at least 60 Hz. Additionally, by low overhead or complexity, the number of multipliers for processing HD video for video stabilization may use less than 2 million gates for the example herein, and such example may have less than 50 multipliers. However, other numbers of resources may be used in other configurations.

Frame buffer memory 304, which may be an internal or external memory to an IC implementing video stabilizer 100 of FIG. 1, may be coupled to receive a source image stream 305, for storing one or more original images 306 to be corrected for translational movement, and each original image 306 may be stored in association with levels of one or more associated downscaled images of an image pyramid.

Each of the down-scaled resolutions 301 may be provided one at a time as output 124 to scene analysis section 110. Additionally, a frame synchronization control signal 311 may be provided from image pyramid generation block 102 to scene analysis section 110 to maintain synchronization between a frame for an image and one or more downscaled resolutions 301 thereof.

Scene analysis block 103 and/or scene analysis module 113 may perform a scene analysis of downscaled resolutions 301. Scene analysis section 110 calculates or otherwise determines a variance for each downscaled resolution, and such variances may be aggregated to provide a variance for a block, which is generally 16 by 16 pixels, though other dimension may be used in other examples. Such variances may be output one at a time after aggregation as output 325. Thus, output 325 may be variance values for blocks of all downscaled resolutions 301, or more generally variance values for blocks of a set of images.

Output 325 may be provided to a dynamic thresholding block 320. Dynamic thresholding block 320 may be configured to select variance values in excess of a variance threshold $\theta_f$. Along those lines, such a threshold may be set dynamically to identify a predefined number of variance values to be in excess of a variance qualifier or qualifying threshold ("variance threshold"). In order to accept or otherwise select those variance values in excess of a variance threshold, block enable signals 321 may be asserted by dynamic thresholding block 320. Block enable signals 321 may be provided to stream multiplexer 302 as control selects to select blocks 303 having variance values in excess of a variance threshold for an associated image. Such selected blocks 303 may be provided to frame buffer memory 304 for storage in association with their corresponding source image. In other words, a selected block 303 is likely to contain a feature point in an image for subsequent motion estimation, and all resolutions 301 for such block may be stored in association with such source image, and all non-selected blocks may be dropped from such image for purposes of subsequent processing.

As determination of variances and image pyramid generation may be implemented in the same hardware blocks. Though determination of block variances may be performed in software, such as by scene analysis module 113, for this example block variances and variance qualifiers are determined in hardware in scene analysis block 103. One formula for determining block variances is:

$$\sqrt{\Sigma_{i=1}^{N}\Sigma_{j=1}^{N}x_{i,j}^2 - m^2}, m = \Sigma_{i=1}^{N}\Sigma_{j=1}^{N}x_{i,j}.$$

In this formula, m is a mean of grayscale values $X_{i,j}$ within an N-by-N ("N×N") block. Another formula that may be used for determining block variances is a sum of absolute differences or SAD, which may be as follows:

$$\sum_{i=1}^{N}\sum_{j=1}^{N}|x_{i,j} - m|.$$

In order to select blocks 303 suitable for further processing, variance values determined at different levels or resolutions 301 of an image pyramid may be aggregated to a single qualifier or variance. This aggregation may take into account that block sizes may vary at different pyramid levels. Along those lines, supposing that an image pyramid has n levels and that block size $N_l \times N_l$ at pyramid level l, namely such pyramid level l is an element of a set of N from 0 to n−1 levels, overall block variance using SAD may be determined as:

$$v_{p,q} = \sum_{l=0}^{n-1} \frac{1}{N_l^2} SADp, q_l,$$

where $v_{p,q}$ is a variance qualifier for a block p, q.

After variance qualifiers $v_{p,q}$ are determined, motion searching may be performed for motion estimation. However, this motion searching may be only on blocks for which their variance qualifier $v_{p,q}$ is greater than a frame threshold value $\theta_f$. After analysis of block variance qualifiers for a frame f, software, such as scene analysis module 113, may determine a suitable frame threshold value for an application and may select blocks, such as blocks 303, having variances above such threshold value. For example, a mean may be determined for variances of all blocks, and such mean may be used as frame threshold value $\theta_f$ to select blocks 303. Blocks 303 may be output, along with an original source image 306, from frame buffer memory 304 as output 125 of scene analysis section 110 for motion estimation section 111.

Figure 4:
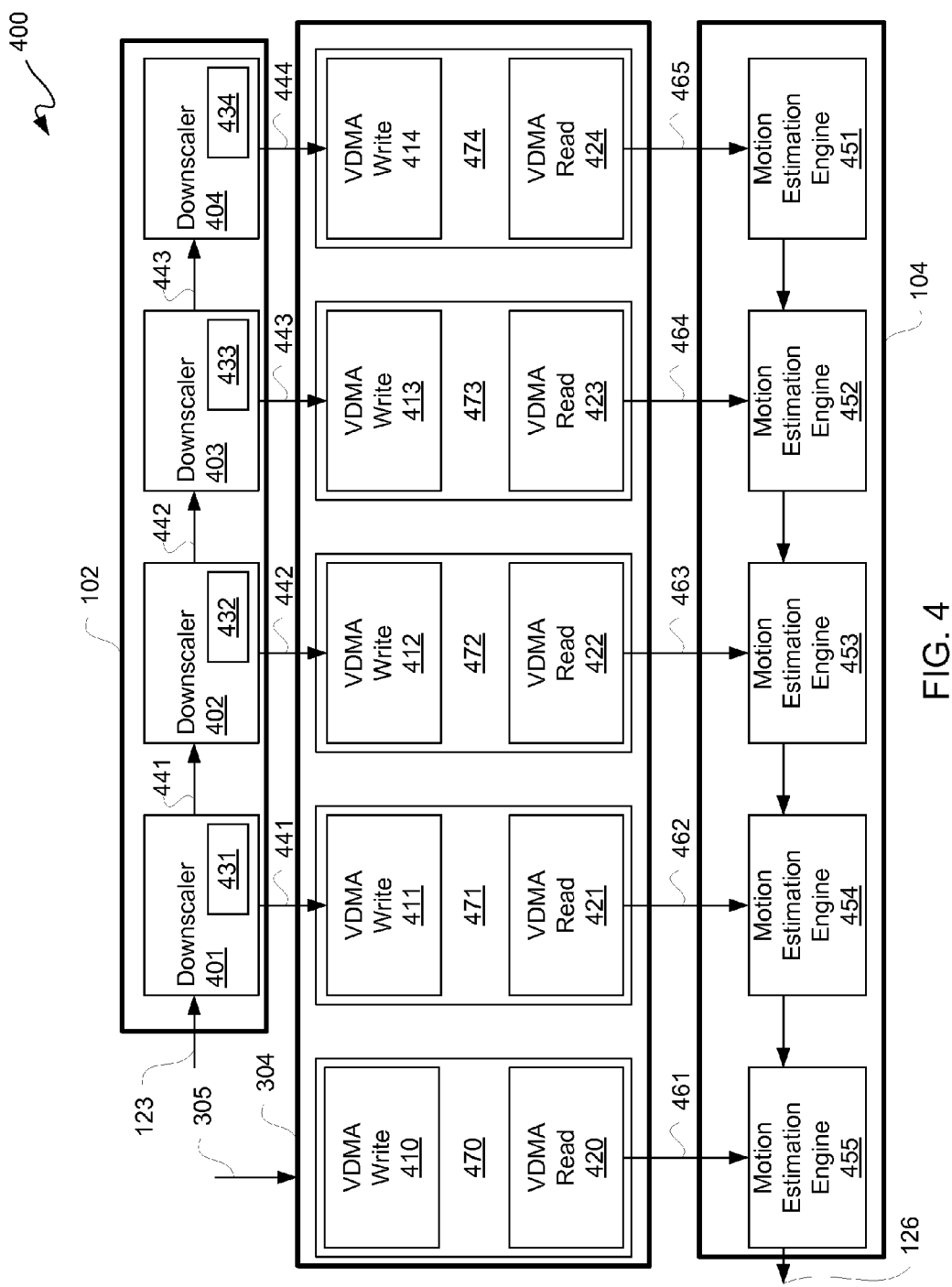
FIG. 4 is a block diagram depicting an exemplary image pyramid construction and motion search flow portion of the video stabilizer of FIG. 1.

Motion estimation may be used to find a best motion vector for translating a block in a reference frame (e.g., the previous video frame) to the current frame, maximizing correlation, and/or minimizing an error function, such as a sum of squared differences ("SSD") or SAD. This may be a computation intensive task. However, for video stabilization, where a large set of block-based motion vectors may be filtered and integrated into a single global motion vector, outliers and erroneous vectors matter less than for optical flow analysis or video encoding. Thus, instead of performing an exhaustive search within an M×M region or search tile as in conventional motion estimation, a binary, hierarchical decomposition of an image to a set of $\log_2 d$ sub-images, namely an image pyramid, is used along with pixel searches, such as +/−1 pixel searches for example, on different image resolutions or layers of such image pyramid, such as image pyramid 200 for example FIG. 4 is a block diagram depicting an exemplary image pyramid construction and motion search flow portion 400 of a video stabilizer 100 of FIG. 1. Recall that LoG filter output 123 may be provided as input to image pyramid generation block 102. In this example, image pyramid generation block 102 includes four downscalers 401 through 404 coupled in series; however, in other configurations fewer or more than four downscalers coupled in series may be used. This portion 400 may be pipelined, where downscalers 401 through 404 for example may have different frames for processing at the same time, and motion estimation engines 451 through 455 may likewise be pipelined.

For a binary, hierarchical image pyramid, each downscaler may perform a ½ downscaling operation. During size reduction, an image, or images for pipelined operation, may sub-sampled (i.e., decimated) by two along both x- and y-axes. However, prior to such sub-sampling, low-pass filtering may be used to avoid aliasing artifacts. Thus, each downscaler 401 through 404 may include corresponding low-pass filters 431 through 434. For a VLSI and/or FPGA implementation, such filtering may be performed using a separable, 3×3 2D FIR kernel for this example. For such an example, before sub-sampling, 3 tap FIR filters with powers of two coefficients [0.25, 0.5, 0.25] both horizontally and vertically may respectively receive inputs to downscalers 401 through 404.

Down-scaled image streams 441 through 444 of respectively output from downscalers 401 through 403 are respectively input to a next downstream downscaler 471 through 474. Additionally, down-scaled image streams 441 through 444 respectively output from downscalers 401 through 404 may be written to a frame buffer memory 304, as previously described, in association with an original, full resolution source image 306 from a source image stream 305, through respective VDMA writes 410 through 414. VDMA engines 470 through 474 may be utilized to transfer image frames to and from frame buffer memory 304.

An original source image 306, as well as such successively down-scaled images or image streams 441 through 444 therefor, may be respectively read from frame buffer memory 304 through corresponding VDMA reads 420 through 424, where VDMA read 420 is a source image read.

Image information from down-scaled image streams 461 through 465 is respectively read from VDMA reads 420 through 424, where such information of down-scaled image streams 462 through 465 corresponds to down-scaled image streams 441 through 444 from prior writes. Additionally, a down-scaled image stream 461 may be a source image read from VDMA read 420 corresponding to a source image read from VDMA write 410.

In this example, d equals 32, and so a motion search may be performed at n=$\log_2$d=5 layers. Accordingly, in addition to a source image, there are 4 down-scaled images generated starting with such source image. Even though a block size may be N=$N_0$=16 on the bottom layer of an image pyramid (i.e., a highest resolution of such image), block sizes ($N_i \times N_j$) at higher layers may be selected at values other than such bottom layer ($N_0 \times N_0$).

Down-scaled image streams 461 through 465 may be input to motion estimation engines 455 through 451, respectively. In this example, block sizes used for motion estimation engines 451 through 455 are 4×4, 4×4, 8×8, 8×8, and 16×6 respectively, meaning that at the highest resolution correlation is performed on 16×16 pixel blocks, while at the lowest resolution correlation is performed on 4×4 pixel blocks. Thus, a 4×4 pixel neighborhood at the lowest resolution in this example corresponds to a 64×64 pixel neighborhood at the highest resolution, and so there is some, though small, loss of precision and accuracy in order to substantially reduce processing overhead. However, in other implementations, these and/or other resolutions may be used. For correlation between resolutions, a +/−1 pixel search may be performed by each of motion estimation engines 451 through 455. Along those lines, each motion estimation engine may start at the center of a frame or resolution level of a frame of an image pyramid, and then each motion estimation engine may progressively move +/−1 pixel up, down, right, and/or left, so a block from a previous frame is compared with a block from a current frame for a search tile that is one pixel larger in each direction (i.e., up, down, right, and left) than a current block size. Thus, in this example, there are nine operations to be performed for checking for a best match between a current frame and a previous frame. Suppose for example a best match is found at one pixel to the right and one pixel down for a current block in a current frame for an associated block in a previous frame. This positional information may be represented as a motion vector, and such positional information may be provided from one motion estimation engine to a next downstream motion estimation engine operating at twice the resolution. However, going from a lower resolution to a next higher resolution, position of such block may be progressively refined at such higher resolution, where the search tile is the same size or larger. In other words, an area being matched is effectively being shrunk going through the chain of motion estimation engines, which increases precision linearly. For example, suppose that the only translation at the lowest resolution is one pixel to the right, so at the highest resolution this corresponds to 16 pixels to the right.

Positional information from a motion estimation engine may be passed downstream to a next motion estimation engine to further refine such position, until a last motion estimation engine refines such position of a frame, namely a motion estimation vector for a frame. Motion estimation engines 451 through 455 are coupled in series such that output of motion estimation engine 451 feeds motion estimation engine 452 along with down-scaled image stream 464, output of motion estimation engine 452 feeds motion estimation engine 453 along with down-scaled image stream 463, and so on until output of motion estimation engine 454 feeds motion estimation engine 455 along with source image stream 461 to provide motion estimation output 126. Thus, a final motion estimation vector for a block may be associated with a highest resolution image, and such motion vector for a block may be part of output 126.

Figure 5:
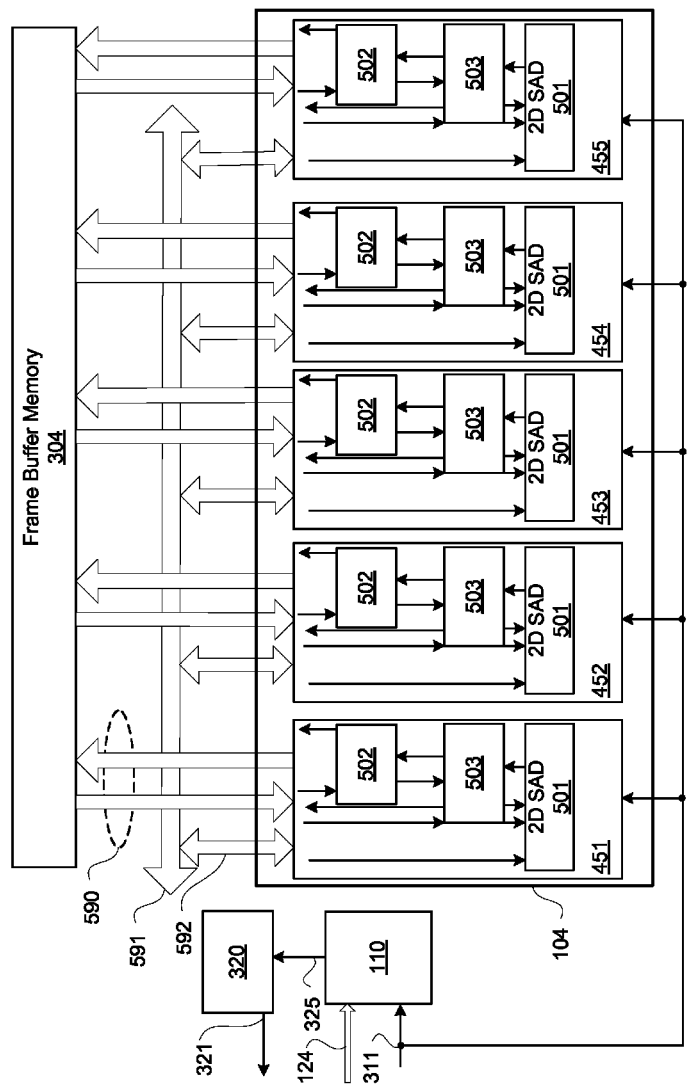
FIG. 5 is a block diagram depicting exemplary motion estimation block with a busing portion of a video stabilizer of FIG. 1.

FIG. 5 is a block diagram depicting exemplary motion estimation block 104 with a busing portion of a video stabilizer 100 of FIG. 1. In this example, frame buffer memory 304 is coupled to motion estimation engines 451 through 455 of motion estimation block 104 through pairs of corresponding read and write AXI4-Stream buses 590, and motion estimation engines 451 through 455 are coupled to a control/status bus 591 through corresponding AXI4-Lite buses 592. Even though AXI4 bus protocols are described for data transmission herein, it should be understood that other bus protocols may be used. These protocols were selected for an FPGA implementation having an embedded ARM core; however, other types of ICs and other types of bus protocols may be used without departing from the scope of this description.

Figure 6:
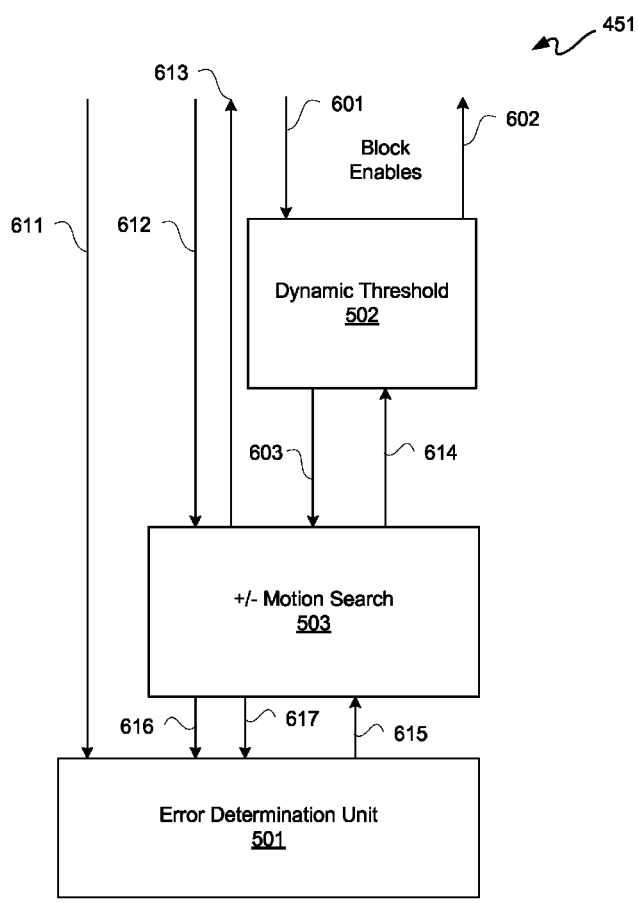
FIG. 6 is a block diagram depicting an exemplary motion estimation engine.

FIG. 6 is a block diagram depicting an exemplary motion estimation engine 451. FIGS. 5 and 6 are further simultaneously described.

Motion estimation block 104 in this example includes motion estimation engines 451 through 455, where each of such motion estimation engines is coupled to receive a frame synchronization signal 311. As motion estimation engines are generally repeats of one another, only motion estimation engine 451 is described in detail for purposes of clarity.

Search tile or pixels 611 for a block therein currently being processed may be input to motion estimation engine 451. Tile pixels 612 for such search tile may be input to motion search block 503 of motion estimation engine 451. Motion estimation engine 451 includes an error determination unit 501, such as a two-dimension ("2D") SAD error determination unit for example, for correlation among images at a resolution level, which may be configured according to:

$$\Sigma_{i=1}^{N}\Sigma_{j=1}^{N}|s_{i+d_x,j+d_y}-r_{i,j}|.$$

In other implementations, a 2D SSD error determination unit may be used instead of a 2D SAD error determination unit, which 2D SSD error determination unit may be configured according to:

$$\text{SSD}_S(d_x,d_y)=\Sigma_{i=1}^{N}\Sigma_{j=1}^{N}(s_{i+d_x,j+d_y}-r_{i,j})^2,$$

where $r_{i,j}$ are grayscale values of an N×N reference block from a previous frame and $S_j$ is an (N+2)-by-(N+2) search tile assuming a search area of +/−1 pixel around the block center, namely where p, q are elements of the set {-1, 0, 1}. An error 615 determined by error determination unit 501 may be provided motion search block 503. Such error 615 may be for a block in a search tile 611. Signals 616 and 617 provided from motion search block 503 to error determination unit 501 may respectively be x-axis and y-axis displacement vectors.

Motion search block 503 may be configured to perform such search, and motion search block 503 may output a motion vector 613, as described below in additional detail, and a corresponding minimum error 614 found for such motion vector output. For reference blocks $s_{p,q}$, a displacement vector δ may be found such that:

$$\delta_{p,q} = \underset{d_x, d_y}{\operatorname{argmin}} (SAD_s d_x, d_y), \text{ and}$$

$$\varepsilon_{p,q} = \underset{d_x, d_y}{\operatorname{min}} (SAD_s d_x, d_y).$$

A minimum SAD error value ($\epsilon_{p,q}$) found during motion search carries information about the quality of a match between a reference block and a best matching block found in a search tile or searched portion of an image. However, it is conceivable that a block with sufficiently high variance, which may include edge content, may have multiple matches producing equally low matching errors. Although for video compression this match may be perfect, this block may be a poor candidate for stabilization purposes.

Along those lines, if a first best match is obtained, then a second best match may be obtained to determine if there is a significant increase or not in error for the second best matching motion vector. In other words, it may be determined that the first best match is unique or stands out if the second best match has a high error as compared with a low error of the first best match. For video stabilization purposes, a second best match in a search tile may be used along the lines of:

$$e_{p,q} = \frac{\varepsilon_{p,q} + c}{\varepsilon'_{p,q} - \varepsilon_{p,q} + c^2},$$

where $\epsilon_{p,q}'$ is a SAD matching error corresponding to the second best match within a search tile, and C is a small constant to avoid division by zero. Along those lines, a unitary metric that takes into account both a first best match error and a second best match error may be used.

Motion estimation engine 451 further includes a dynamic threshold module 502 to control the number of blocks selected for further analysis. Dynamic threshold module 502 receives a block enable signal 601 and generates a block enable signal 602. For example, a logical 0 for an block enable signal 601 indicates that the next block in a sequence to be processed may already be disabled or not used, and so no motion estimation needs to be performed on such current block due to high error values at previous motion estimation levels and/or low initial variance calculated for such current block. For disabled blocks, dynamic threshold module 502 propagates such logical 0 value to its output 603 for input to motion search block 503. For blocks which are to be used, namely activated or enabled, a motion search may be performed by motion search block 503 at a current level, and an output block enable signal 602 may be set or asserted if an error calculated or otherwise determined for such block is below a current threshold value. Dynamic thresholding module 502 receives a minimum error 614 for a motion vector 613, and if such minimum error 614 is above a threshold value therefor, then such motion vector 613, or block associated therewith, is discarded for subsequent use.

In other words, if an error is too high, then confidence in using such block is too low to use such block. By discarding such blocks, resources are not used on blocks that likely are not going to be good matches, and such resources may thus be used on blocks having motion vectors with substantial movement that are more likely uniquely identifiable from frame-to-frame of an image or associated images therefor. This distinction may be used to provide video stabilization when background is moving or objects are moving between the background and an object being recorded.

Dynamic thresholding module 502 may be the same hardware or software module used for a variance determination, as a threshold value may be set such that the overall number of blocks enabled in a frame approximates a set value. In accordance with FIG. 1, dynamic thresholding, or parts of it (such as setting threshold values) may be implemented in software, such as in motion estimation module 114. For example, in a low-level driver associated with VLSI hardware components of video stabilizer 100. Motion estimation module 114 may set an expected number of blocks statically or dynamically according to video content. For example, 50% of the blocks in a search tile may be kept after variance thresholding, and then that number of blocks kept may be linearly reduced across the a motion estimation pipeline to 20% at a final motion estimation engine, such as motion estimation engine 455 in this example. However, these or other percentages may be used to handle a variety of video samples. In a software embodiment of block 320, $\theta_t$ may be calculated by sorting block variances and setting $\theta_t$ at the variance level of block t in the ordered list, where t is the expected number of blocks to be kept at a particular pyramid level.

Returning to FIG. 1, output 126 of motion estimation section 111 may be provided to vector processing module 115. In order to establish a global motion vector, such as a single global motion vector representative of a camera's motion, measured block-based motion vectors may be aggregated to provide a single global motion vector therefor. In an implementation, a motion vector space may be defined as a two-dimensional histogram of motion vectors to provide an efficient representation of motion across of an entire image frame. As motion vector components are $(1+\log_2 d)$ bit signed integers in the range $\{-d..d\}$, irrespective of video format frame size (e.g., 1080p HD or 4K2K), an image histogram size is $(2d+1)^2$, which may be dependent only a maximum expected frame-to-frame motion d.

For purposes of clarity by way of example and not limitation, FIG. 7A is a graphical diagram depicting an exemplary 2D histogram 700 of motion vectors. For this example, it shall be assumed that d equals 32 though other values may be used, and a sparse array, such as a 65×65 unsigned integer array, may be sufficient to describe motion. An intersection 703 of axes or crosshairs 704 and 705, namely a (0,0) vector, is a location indicating no motion on histogram 700. Assuming a video sequence to be analyzed for example has a background and a moving vehicle in the foreground, such background and vehicle may show up in histogram 700 as two well distinguished patches 701 and 702, which in a three dimensional representation may show up as two peaks. Generally, the more blocks found with the same motion vector, the taller a peak may be. Moreover, the more dispersion in errors of such motion vectors for such blocks, the wider a patch may be. Suppose for example the vehicle in the example is a moving van, as the moving van takes up more of the frame, such patch associated therewith gets larger, and the patch associated with the background, which effectively occupies less of the frame due to the large moving van, gets smaller. However, as the moving van exits the scene, then its associated patch gets small, and the background patch gets larger. These changes in direction from tracking background to tracking a moving van (or other moving object) back to tracking background may be smooth, which may produce a higher quality video stabilization result.

Assuming for a current scene that a camera is starting to follow such vehicle as indicated by patch 702, which is smaller than patch 701. Accordingly, larger patch 701 may represent background indicating horizontal motion as well. In this example, a camera was panning when the vehicle entered the scene or frame, and so patch 701 is not centered to the frame.

Again, for purposes of clarity by way of example and not limitation, FIG. 7B is a graphical diagram depicting the exemplary 2D histogram 700 of motion vectors of FIG. 7A after rendering. Along those lines, a histogram for a previous frame may be stored for aggregation with a histogram for a current frame, and such aggregated histogram may be carried forward for determining a best overlay of a current frame histogram onto such aggregated histogram. Once such best overlay position is found, such aggregated histogram may be overlaid with such current histogram to provide a current or updated aggregated histogram, and so on.

In this example, patches 721 and 722 of a current histogram may be found in generally what were patches 701 and 702, respectively, of a previous or aggregated histogram, and respective corona-like regions 701 and 702 may be corresponding remnants of patches 701 and 702 of such a previous or aggregated histogram prior to update with the current histogram. Patch 711 may be associated with where an overlaid current histogram, namely a portion of patch 721, and a previous or aggregated histogram portion, namely a portion of patch 701, match. FIGS. 7A and 7B is just an example for purposes of clarity, and such data processing for aggregating histograms into a unitary histogram is more generally described below in additional detail. In the example below, aggregation of histograms is generally performed in software.

FIG. 8 is a flow diagram depicting an exemplary motion vector processing flow 800, such as may be used for vector processing module 115 of FIG. 1. Before motion vector processing, a number of preprocessing operations 810 may be performed on a 2D histogram 700 for motion vector processing flow 800.

At 801, thresholding may be performed on bins of 2D histogram 700. For example, If $B_{max}$ represents a maximum value found in any of the bins of 2D histogram 700, a threshold t may be set to equal $B_{max}/64$, and all of such bins with values less than t may be set to remove outlier vectors (e.g., erroneous motion-vectors or small objects). Even though the number 64 is used as a denominator to continue the above example, other values may be used in other implementations.

At 802, a clipping bin of 2D histogram 700 values at a multiplier of t, such as 5t for example, may be used to ensure large clusters do not overshadow smaller, relevant clusters during subsequent motion vector processing. At 803, filtering, such as low-pass filtering, may be performed. For example, a 2D Gaussian filter may be used with a Gaussian filter kernel as previously defined herein. For such kernel, R may be set equal to 4 to ensure a smooth gradient around clusters; however, other values may be used.

It should be understood that for motion vector aggregation, any abrupt camera shake (e.g., high frequency motion), which may effectively be added to all measured motion vectors, may translate the distribution of 2D histogram 700 along a frame-to-frame measured high frequency motion vector. Similarly, camera panning may translate 2D histogram 700, but, with panning, 2D histogram 700 translation may be smooth in comparison to an abrupt movement. Objects moving relative to one-another may introduce a new patch or cluster on 2D histogram 700 or may cause existing patches to shift relative to one another. Spatially disjointed, separate objects moving at the same speed and direction may be indistinguishable on 2D histogram 700. Objects rotating along a z axis may be circularly spread out patches on 2D histogram 700, whereas objects rotating along an x-axis 704 may spread out in a y-axis 705 direction of 2D histogram 700, and vice versa. These effects, along with noisy, imperfect motion vectors, may introduce several problems to explicit clustering in a motion vector space. Besides computation costs, clusters may merge, split, appear, and disappear, which may make representing and tracking discrete clusters infeasible.

Instead of attempting to track discrete clusters, at 804 a translation vector, which may be a best translation vector for a histogram, may be found. Such a translation vector may map a latest two-dimensional histogram measurement to an accumulated set of histogram results according to:

$$\overline{v}_k = \underset{d_x, d_y}{\operatorname{argmin}} \left\{ \sum_{i=-d}^{d} \sum_{j=-d}^{d} [A_{k-1}(i, j) - BR(H_k(i, j), (d_x, d_y))]^2 \right\},$$

$$dx, dy, \in \mathbb{R} \{-d \ldots d\},$$

where: $H_k(x, y) \in \mathbb{Z} \{-d..d\}$ is a pre-processed two-dimensional histogram for frame k; $BR(H_k(i,j), d_x, d_y)$ is a bilinear resampling operator shifting matrix $H_k(i,j)$ by $d_x, d_y$ allowing sub-pixel translation and sample replication padding around edges; and $A_k$ i,j is an accumulated histogram. Such accumulated histogram may be defined as:

$$A_k(i, j) = \begin{cases} H_0(i, j) & |k = 0 \\ (1 - a_1)A_{k-1}(i, j) + a_1 BR(H_k(i, j), HP(\overline{v}_k)) & |k > 0 \end{cases},$$

where $a_1$ is a temporal feedback coefficient, and HP ($\overline{v}_k$) is a high-pass filtered component of $\overline{v}_k$, which is described below in additional detail. The above equation can be interpreted as a 1 tap, temporal, low-pass IIR filter for filtering the entirety of a 2D histogram 700. In an implementation, $a_1$ may be set to a constant value, such as $a_1$ equal to 0.0625 for example, or $a_1$ may be changed dynamically when scene changes are detected.

Solving for a translation vector at 804 may be a non-trivial task, considering the size of a search area, the sizes of matrices to be correlated, and the expected numerical precision of a result (e.g., a real-valued vector). As indicated in FIG. 1, this operation, along with the rest of motion vector processing may be implemented in software. To reduce computational costs, a translation vector or aggregated motion vector may be found at 804 using operations 805 through 807. At 805, horizontal and vertical projections of both $H_k$ and $A_{k-1}$ may be generated according to:

$$H_k^H(x) = \Sigma_{i=0}^{2d} H_k(x,i), \text{ and } A_{k-1}^V(y) = \Sigma_{i=0}^{2d} A_{k-1}(i,y).$$

At 806, 1D correlations, between such horizontal and vertical projections generated at 805, may be performed according to:

$$C_k^H(x) = \sum_{i=-d}^{d} H_k^H(x) A_{k-1}^H(x - i),$$

$$C_k^V(y) = \sum_{i=-d}^{d} H_k^V(y) A_{k-1}^V(y + i),$$

where $A_{k-1}^H$ x and $A_{k-1}^V$ y have been padded with d zeros on both sides to facilitate cross-correlations. It should be appreciated that discarding of any correlation results, namely horizontal or vertical projections or peaks, is not done at this point. In other words, all candidates may have been kept to this point of aggregation.

At 807, sets of horizontal and vertical vertices may be established using thresholding cross-correlation functions:

$$X = \arg_x \left( C_k^H(x) > 0.9 \max_x C_k^H(x) \right),$$

$$Y = \arg_y \left( C_k^V(y) > 0.9 \max_y C_k^V(y) \right)$$

A Cartesian product of sets X and Y represent candidate translation vectors. Generally, using cross-correlations, best correlations in X- and Y-directions may be found. At 808, for all candidate translation vectors, full two-dimensional SSD may be performed for aggregation between $H_k$ and $A_{k-1}$ according to:

$$SSDx, y = \sum_{i=1}^{2d} \sum_{j=1}^{2d} (H_k(i, j) - A_{k-1}(i+x, j+y))^2,$$

and a global minimum of the set of coordinate product(s) may be found according to:

$$m(x,y) = \arg\min_{x \in X, y \in Y} \{SSD(x,y)\}.$$

Therefore, a minimum error for each candidate aggregation of vectors, namely each translation vector, may be determined to obtain a set of translation vectors, and minimum errors may indicate the best correlations thereof, namely which of the translation vectors in a set should be selected. However, there may be more than one candidate at this point in the process having a same minimum error. To resolve which one of these candidates to use, a further refinement using a sub-pixel resolution may be used. For example, jitter is not necessarily in amounts of an integer pixel, and if jitter is measurable to some fraction of a pixel, then an image portion associated therewith may be in more than one pixel.

At 809, aggregated motion vectors may be refined into sub-pixel resolutions. For example, such refinement may be into sub-pixel resolutions using a known simulated annealing optimization or other form of optimization. After a predetermined number of approximations, a translation vector or aggregated vector ($v_k$) with a smallest error may be selected at 810. In an implementation, a total of 100 iterations may be performed, with a constant variance var($\delta$)=0.5. However, in other implementations, other numbers of iterations and/or other variance values may be used. Generally, further refinement for determining a best overlay of a current histogram to a previous aggregated histogram may be done at a sub-pixel level.

Returning to the example of FIGS. 7A and 7B, if a camera is panned at a constant velocity and a vehicle moves within a frame at a constant velocity, then blocks associated therewith generally may seem stationary. However, if a camera operator's hand is shaking, these blocks may have some dislocation due to jitter, and this jitter may be measurable as described above.

Returning to FIG. 1, vector output 127 of vector processing module 115, such as a translation vector ($v_k$) from 810 of FIG. 8, may be provided to a predictive filtering module 116. Accordingly, at this point, translation vectors for corresponding frames, namely frame-to-frame displacement vectors, have been determined, and these translation vectors may be used for video stabilization as described below in additional detail. By progressively aggregating translation vectors frame-by-frame, cropping vectors may likewise be progressively and predictively determined. Thus, frame-by-frame cropping and scaling (i.e., zooming out) may be used. In this example, aggregation of translation vectors for progressively determining cropping vectors is in software; however, in other configurations hardware may be used.

Video stabilizer 100 is expected to react differently to jittery and steady global motion. Translation jitter is compensated for, but steady panning may be retained in a video stream. Along those lines, an accumulated histogram $A_k(i,j)$ may be used to adapt to the low frequency component of $v_k$.

In an implementation of a predictive filtering module 116, $v_k$ may be low-pass filtered to identify any steady, panning component. As previously described, in an implementation, a 1 tap IIR filter according to $m_k=(1-a_2)m_{k-1}+a_2 v_k$ may perform separation of high- and low-frequency jitter components. In other implementations, other numbers of taps and/or other types of filters may be used.

A high-frequency jitter component of $v_k$ may be filtered using a high-pass (HP) filter according to:

$$HP(v_k)=v_k-m_k=(1-a_2)(v_k-m_{k-1}),$$

where HP ($v_k$) is fed back to update an accumulated histogram, as previously described. Such an IIR or other type of filter may be used to predict the next value of $v_k$. The difference between an actual measured value and a predicted value may be assumed to be noise (i.e., error induced by noise), and video stabilizer 100 may be configured to compensate for any difference between such two values.

Returning to FIG. 1, a predictively filtered translation vector output 128 of predictive filtering module 116 may be provided to cropping block 105. Again, cropping block 105 may be configured for cropping on a sub-pixel basis. For electronic video stabilization provided by video stabilizer 100, only a cropped portion of captured video frames may be displayed.

Figure 9:
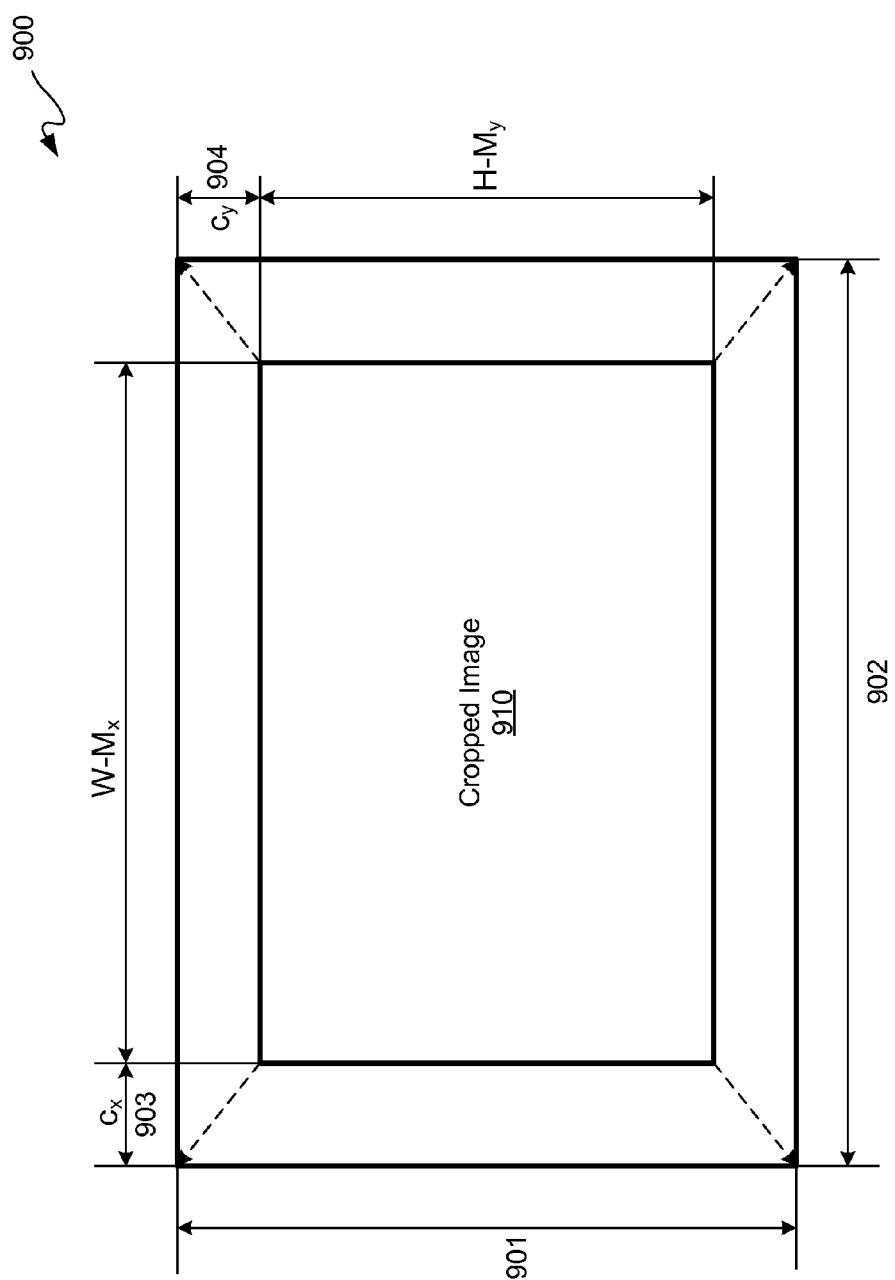
FIG. 9 is a block diagram depicting an exemplary image frame.

Along those lines, FIG. 9 is a block diagram depicting an exemplary image frame 900. Image frame 900 has a height, H, 901 and a width, W, 902. Within image frame 900 may be a cropped image 910. There is an x-axis cropping offset or position ($c_x$) 903 from both right and left edges of image frame 900, and a y-axis cropping offset or position ($c_y$) 904 from both top and bottom edges of image frame 900. Horizontal and vertical margins ($M_x$, $M_y$) may respectively be twice the size of an associated maximum cropping offset.

By changing the cropping position ($c_k=\{c_x, c_y\}$) such that scene objects in a cropped sequence appear at a stable location, jitter may be eliminated. However, there is a limited range in which cropping may be used to compensate for jitter. As illustrated in FIG. 9, video stabilizer 100 may compensate a maximum jitter amplitude, which may be half of each of margins ($M_x$, $M_y$) set initially for cropping, assuming an initial cropping position was at the center of an input frame 900. For applications where the mean of jitter is 0, this condition is met. If excursions are asymmetrical; more likely, or more extensive in certain directions, an initial cropping position may be set accordingly so as to use cropping margins more efficiently (e.g., if motion of a wall-mounted camera is bound by obstacles so jitter excursions are only expected right and below, an initial cropping position any be the top left corner of an input image.)

For applications that have an output video format equivalent to the input format (e.g., input and output frame dimensions may be equal), a cropped image may need to be scaled up, namely zoom the cropped image to fit the original output size. Cropping introduces loss of information around the edges, and up-scaling may introduce interpolation artifacts. Margin sizes represent a tradeoff between visual quality degradation due to cropping and scaling, with quality improvements due to jitter suppression. In an implementation, a right and left margin $M_x$ may be set equal to 0.1 W and a top and bottom margin $M_y$ may be set equal to 0.1 H; however, these and/or other relationships of margins to width and/or height may be used. To suppress interpolation artifacts introduced during scaling while keeping an implementation footprint down, bicubic interpolation may be used, which may be implemented as a separable, polyphase filter with 4 taps and 16 phases. In other implementations, other numbers of taps and phases may be used, or other types of interpolation artifact suppression may be used.

Motion vector processing involves setting a cropping position ($c_k$) based on a measured frame-to-frame global motion ($v_k$) measured. Generally, to map a reference frame back to its original position, cropping position may be the sum of frame-to-frame motion (i.e., accumulated motion).

Figure 10:
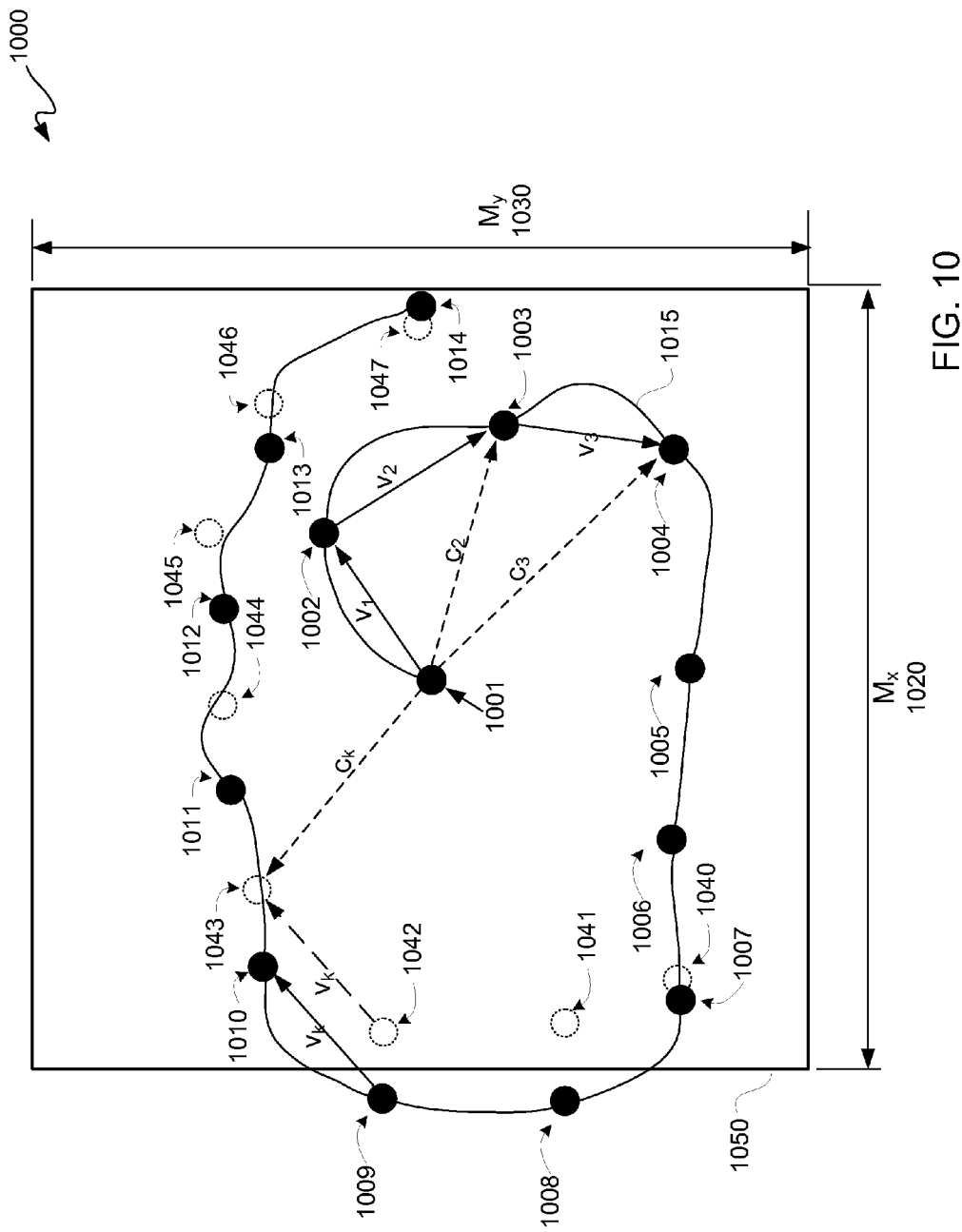
FIG. 10 is a graphical diagram depicting exemplary frame-to-frame motion versus accumulated motion for a sequence of frames.

FIG. 10 is a graphical diagram depicting exemplary frame-to-frame motion versus accumulated motion for a sequence of frames 1000. In this example, sequence of frames is frames 0 through 13 are represented by solid block dots 1001 through 1014, respectively. In other examples, fewer or more frames than 14 may be used in a sequence of frames. Generally, solid black dots 1001 through 1014 may be thought of as ideal sampling positions fully cancelling out jitter, and curved line 1015 on which such solid back dots lie may be thought of as representing movement of an image sensor, e.g., camera motion or camera trajectory, from being centered at frame 0.

Relationships between frames 1001 and 1002, 1001 and 1003, and 1001 and 1004 may be expressed in terms of measured global motion vectors ($v_k$) between adjacent frames and cropping position ($c_k$) with reference to a reference frame, namely $c_1=v_1$, $c_2=c_1+v_2$, and $c_3=c_2+v_3$, and so on. Thus, cropping vectors indicate where to crop from for translation back to a reference frame position. In this example, a reference frame is frame 1001. However, simple accumulation of frame-to-frame motion may lead to artifacts if accumulated motion ($c_k$) is outside the cropping/compensation range (M). Accordingly, cropping block 105 of FIG. 1 may receive predictively filtered translation vector output 128 for setting cropping position ($c_k$) based measured global motion vectors ($v_k$).

Effectively, stabilization or cropping range 1050 is a maximum amount for which cropping may be performed without going out of a frame. If a frame or frames have translational jitter in excess of such stabilization range 1050, then virtual frames or sampling positions 1040 through 1047 for example, corresponding to frames 1007 through 1014 may be generated. For example, sampling point 1010 may be an actual camera position captured at frame k, and sampling point 1043 may be virtual camera position captured at frame k. Thus, a hierarchical down-scaling as previously described may be used to shrink an image down to where virtual sampling points may be used to compensate for being out-of-bounds of stabilization range 1050. Generally, as a frame approaches an edge or edges of a stabilization range 1050, frame sampling position may be compensated by a shift in an opposite direction away from such edge or edges. This shifting to stay in stabilization range 1050 may be done predictively, in anticipation of a subsequent frame or frames being out of such stabilization range 1050. While this may cause some negative impact on video stabilization, as such frames may be shifted away from optimal cropping positions, overall impact is a smoother sequence of frames rather than a jarring or sudden impact of one or more out-of-range frames.

Figure 11:
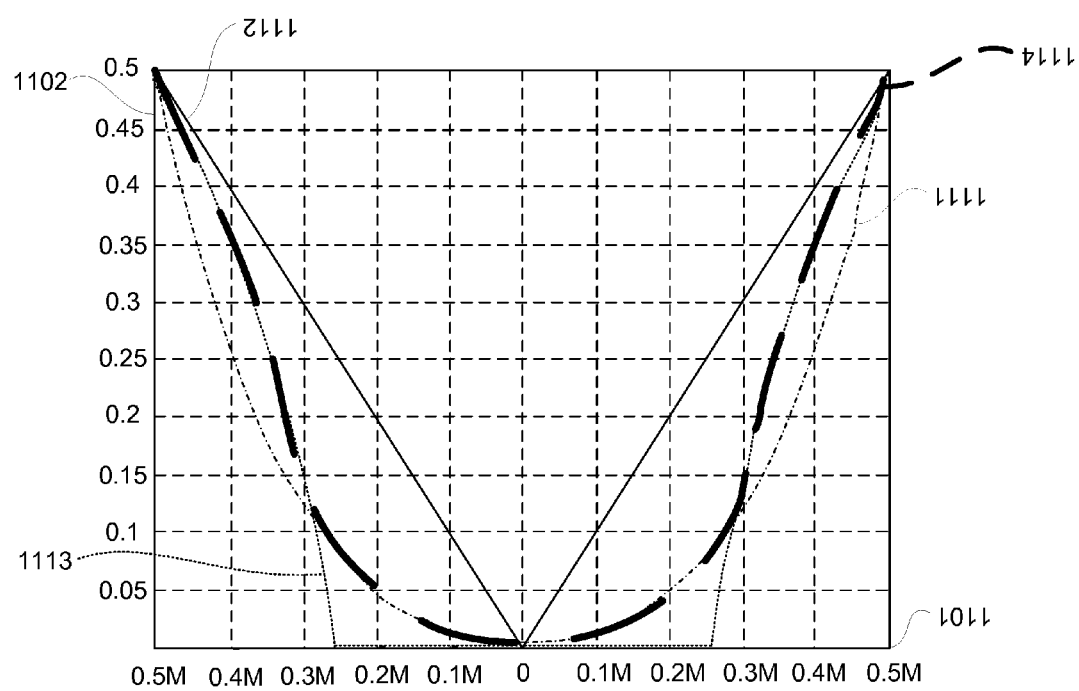
FIG. 11 is a graphical diagram depicting exemplary progressive functions to increase motion accumulations towards an end of a stabilization range M of FIG. 10.

Cropping block 105 may include an adaptive filter 155 for motion accumulation configured according to:

$$\bar{c}_k = \begin{cases} 0, & |k=0 \\ \langle (1-\bar{b}_k)\bar{c}_{k-1} + \bar{v}_k \rangle_{-M/2}^{M/2} & |k>0 \end{cases},$$

where horizontal and vertical components of $b_k=[b_x, b_y]$, $0<b_x, b_y<0.5$ may be used to control an accumulation loss, and $\langle x \rangle_{-M/2}^{M/2}$ represents clipping and clamping of x at $-M/2$ to $M/2$. In other words, over time the value of a cropping position may be discounted by adaptive low-pass filtering, such as with an IIR or an FIR filter in order to keep a portion of the previous value of $c_k$ and adding in the current value of $c_k$. For example, suppose an object on a table being video recorded has the camera suddenly flicked up and afterwards remains in its shifted position, this allows compensation for cropping to occur with a slow gradual migration back to an original centered position. As components of cropping position ($c_k$) approach the ends of a stabilization range (M) 1050, a corresponding component of an IIR filter coefficient ($b_k$) may be progressively increased, as indicated in the example of FIG. 11. Stabilization range 1050 may have an x-axis component $M_x$ 1020 and a y-axis component $M_y$ 1030. A distinction may be made between a maximum stabilization range, which is 0 to M−1, or −(M/2)+1 to (M/2)−1, and a maximum measured frame-to-frame displacement or motion, +/−d.

FIG. 11 is a graphical diagram depicting exemplary progressive functions to increase motion accumulations towards an end of a stabilization range M 1050 of FIG. 10. In other words, as previously described, virtual sampling positions may be generated in response to actual frame positions predictively going out of a stabilization range M 1050. There are several functions any of which may be used for predicting such virtual frame positions, as graphically depicted in FIG. 11.

Generally as $c_k$ is close to the center of a stabilization range M 1050, jitter is absorbable as an IIR filter coefficient $b_k$ is equal to or close to zero; however, as $c_k$ gets closer to a border of such a stabilization range M 1050, then such an IIR filter coefficient $b_k$ gets larger in order to progressively adjust sampling position, which may lead to a virtual sampling position different from an actual sampling position. Slopes of curves or lines of such functions may indicate a rate of change of IIR filter coefficient $b_k$ relative to cropping position $c_k$, and for some threshold rate of change, virtual sampling positions may be generated from actual sampling position.

For purposes of clarity by way of example, an M=128 and d=31 are used in the example of FIG. 11; however, these or other values may be used in other examples. In this example, x-axis 1101, which is for $c_{k-1}$, is from −0.5M to +0.5M, and y-axis 1102, which is for $b_k$, is from 0 to 0.5.

A lower bound ("lb") function represented by a dotted line 1113 may be mathematically expressed as:

$$lb(c_{k-1}) = \left\langle 1 - \left| \frac{\frac{M}{2}-d}{c_{k-1}} \right| \right\rangle_0^1$$

where such equation represents IIR filter coefficient $b_k$ values that ensure even maximum possible $\bar{v}_k$ values (e.g., $v_{k,x}=d$)

may result to $\bar{c}_k$ be in the −M/2 to M/2 range. While use of this function allows for clipping-clamping logic to be avoided in a hardware implementation or no boundary checking in software implementation, a central area of this function is flat, meaning no accumulation loss for small excursions, and so error accumulation may eventually lead to $c_k$ to migrate to the knee points of such a lower bound function on a random walk.

An absolute value ("ab") function represented by a solid line 1112 may be mathematically expressed as:

$$ab(c_{k-1}) = \left|\frac{2c_{k-1}}{M}\right|.$$

While readily implementable in VLSI hardware or in software, a high gradient of this function is close to the center of a stabilization range which may lead to residual jitter appearing in an output stream, even for relatively small excursions around such center.

An exponentially bounded ("eb") function represented by a dashed-dotted line 1111 may be mathematically expressed as:

$$eb(c_{k-1}) = \frac{1}{2e}\left(e^{\frac{4c_k^2-1}{M^2}} - 1\right),$$

may confer a flat, but non-zero, area close to the center of a stabilization range, but may require boundary checks (e.g., clipping and/or clamping) to ensure eb $c_{k-1}$ the above described motion accumulation equation for k equal to or greater than zero results in $c_k$ being in the −M/2 to M/2 range.

A predetermined bounded ("pb") function represented by a dashed line 1114 may be mathematically expressed as:

$$pb(c_{k-1}) = \max(eb(c_{k-1}), lb(c_{k-1})) = \max\left\{\frac{1}{2e}\left(e^{\frac{4c_k^2-1}{M^2}} - 1\right), 1 - \left|\frac{\frac{M}{2}-d}{c_{k-1}}\right|\right\}.$$

This pb function need not use boundary checking, may prevent random error accumulation, and may suppresses residual jitter for small excursions. This function may be calculated for values of interest, and such pre-calculated values may be stored for effectively storing such function. For an implementation, such pre-calculated values for this function may be stored in a Look-Up-Table ("LUT") for both hardware and software implementations; however, other forms of storage may be used. As LUTs are readily available in FPGAs, an FPGA form of an IC is described below for purposes of implementation of a video stabilization system. However, it should be understood that other types of ICs may benefit from the above-described technology.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 12:
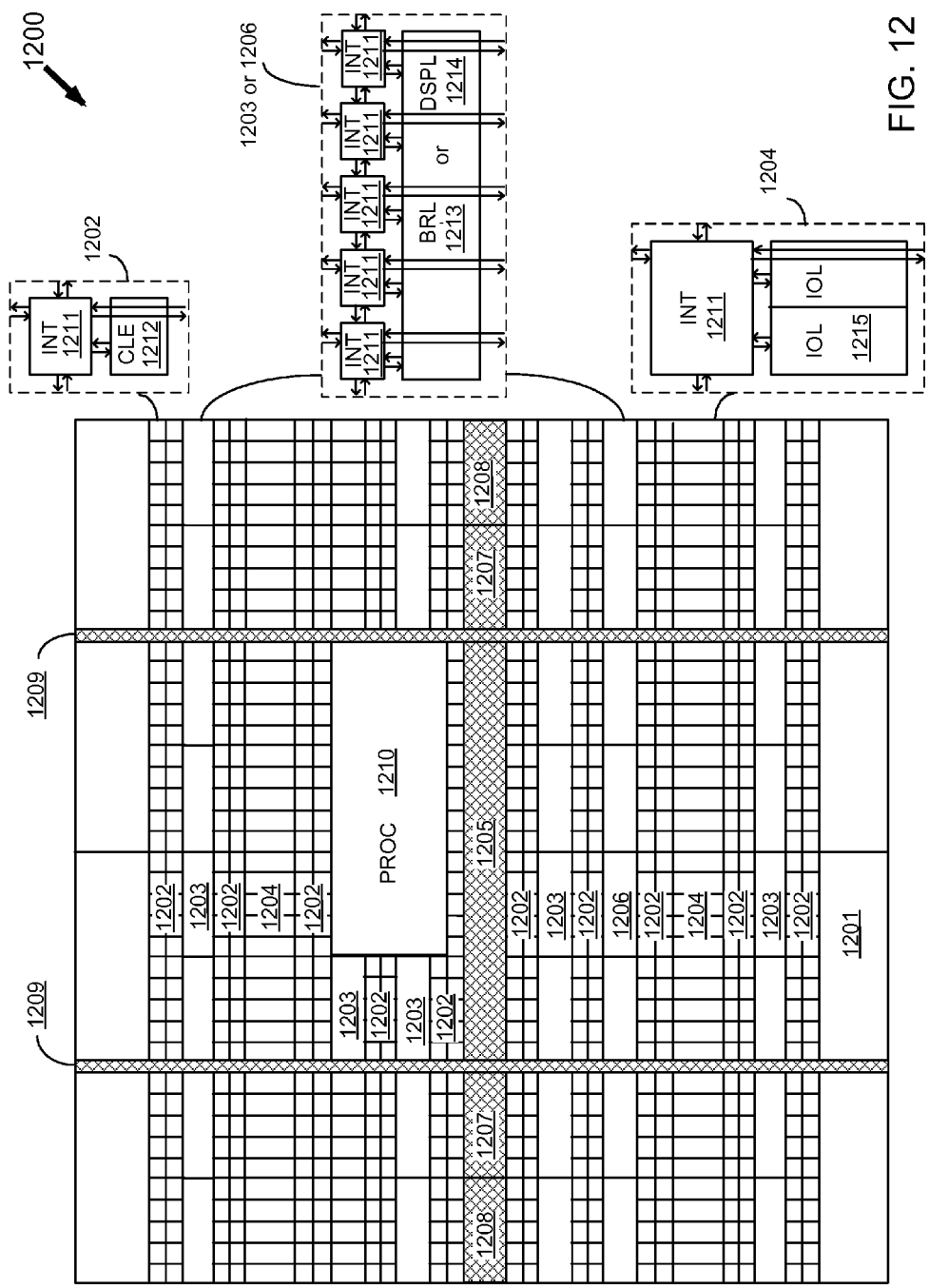
FIG. 12 is a simplified block diagram depicting an exemplary columnar Field Programmable Gate Array ("FPGA") architecture.

As noted above, advanced FPGAs can include several different types of programmable logic blocks in the array. For example, FIG. 12 illustrates an FPGA architecture 1200 that includes a large number of different programmable tiles including multi-gigabit transceivers ("MGTs") 1201, configurable logic blocks ("CLBs") 1202, random access memory blocks ("BRAMs") 1203, input/output blocks ("IOBs") 1204, configuration and clocking logic ("CONFIG/CLOCKS") 1205, digital signal processing blocks ("DSPs") 1206, specialized input/output blocks ("I/O") 1207 (e.g., configuration ports and clock ports), and other programmable logic 1208 such as digital clock managers, analog-to-digital converters, system monitoring logic, and so forth. Some FPGAs also include dedicated processor blocks ("PROC") 1210.

In some FPGAs, each programmable tile includes a programmable interconnect element ("INT") 1211 having standardized connections to and from a corresponding interconnect element in each adjacent tile. Therefore, the programmable interconnect elements taken together implement the programmable interconnect structure for the illustrated FPGA. The programmable interconnect element 1211 also includes the connections to and from the programmable logic element within the same tile, as shown by the examples included at the top of FIG. 12.

For example, a CLB 1202 can include a configurable logic element ("CLE") 1212 that can be programmed to implement user logic plus a single programmable interconnect element ("INT") 1211. A BRAM 1203 can include a BRAM logic element ("BRL") 1213 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 1206 can include a DSP logic element ("DSPL") 1214 in addition to an appropriate number of programmable interconnect elements. An IOB 1204 can include, for example, two instances of an input/output logic element ("IOL") 1215 in addition to one instance of the programmable interconnect element 1211. As will be clear to those of skill in the art, the actual I/O pads connected, for example, to the I/O logic element 1215 typically are not confined to the area of the input/output logic element 1215.

In the pictured embodiment, a horizontal area near the center of the die (shown in FIG. 12) is used for configuration, clock, and other control logic. Vertical columns 1209 extending from this horizontal area or column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic. For example, processor block 1210 spans several columns of CLBs and BRAMs.

Note that FIG. 12 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 12 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 13:
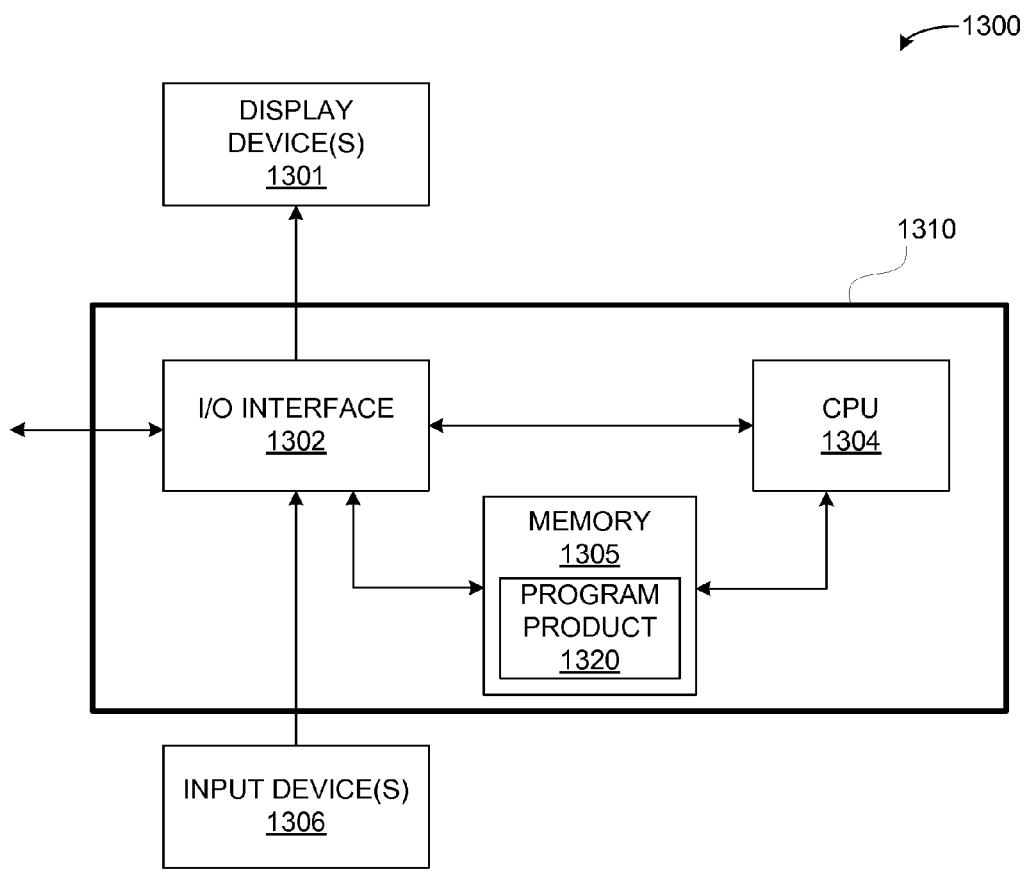
FIG. 13 is a block diagram depicting an exemplary computer system.

FIG. 13 is a block diagram depicting an exemplary computer system 1300.

Computer system 1300 may include a programmed computer 1310 coupled to one or more display devices 1301, such as Cathode Ray Tube ("CRT") displays, plasma displays, Liquid Crystal Displays ("LCD"), projectors and to one or more input devices 1306, such as a keyboard and a cursor pointing device. Other known configurations of a computer system may be used. Computer system 1300 by itself or networked with one or more other computer systems 1300 may provide an information handling system.

Programmed computer 1310 may be programmed with a known operating system, which may be Mac OS, Java Virtual Machine, Real-Time OS Linux, Solaris, iOS, Android Linux-based OS, Unix, or a Windows operating system, among other known platforms. Programmed computer 1310 includes a central processing unit (CPU) 1304, memory 1305, and an input/output ("I/O") interface 1302. CPU 1304 may be a type of microprocessor known in the art, such as available from IBM, Intel, ARM, and Advanced Micro Devices for example. Support circuits (not shown) may include cache, power supplies, clock circuits, data registers, and the like. Memory 1305 may be directly coupled to CPU 1304 or coupled through I/O interface 1302. At least a portion of an operating system may be disposed in memory 1305. Memory 1305 may include one or more of the following: flash memory, random access memory, read only memory, magneto-resistive read/write memory, optical read/write memory, cache memory, magnetic read/write memory, and the like, as well as non-transitory signal-bearing media as described below.

I/O interface 1302 may include chip set chips, graphics processors, and/or daughter cards, among other known circuits. An example of a daughter card may include a network interface card ("NIC"), a display interface card, a modem card, and a Universal Serial Bus ("USB") interface card, among other known circuits. Thus, I/O interface 1302 may be coupled to a conventional keyboard, network, mouse, display printer, and interface circuitry adapted to receive and transmit data, such as data files and the like. Programmed computer 1310 may be coupled to a number of client computers, server computers, or any combination thereof via a conventional network infrastructure, such as a company's Intranet and/or the Internet, for example, allowing distributed use for interface generation.

Memory 1305 may store all or portions of one or more programs or data to implement processes in accordance with one or more embodiments hereof to provide video stabilization program product 1320. Additionally, those skilled in the art will appreciate that one or more embodiments hereof may be implemented in hardware, software, or a combination of hardware and software. Such implementations may include a number of processors or processor cores independently executing various programs and dedicated hardware or programmable hardware.

One or more program(s) of video stabilization program product 1320, as well as documents thereof, may define functions of embodiments hereof and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD). The above embodiments specifically include information downloaded from the Internet and other networks. Such non-transitory signal-bearing media, when carrying computer-readable instructions that direct functions hereof, represent embodiments hereof.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
preprocessing an image for noise suppression and edge detection with filters;
hierarchically decomposing the image to provide an image pyramid;
wherein the hierarchically decomposing includes successively down-scaling the image to provide different resolutions of the image corresponding to levels of the image pyramid;
wherein the image and the different resolutions of the image provide a set of images;

performing a scene analysis of the set of images;
wherein the performing of the scene analysis includes determining variance values for blocks of the set of images for feature tracking;
selecting a subset of the blocks determined to be qualified for the feature tracking responsive to a subset of the variance values associated with the subset of the blocks being above a variance qualifier threshold; and
performing motion estimation on the subset of the blocks;
wherein the performing of the motion estimation uses a hierarchical set of motion estimation engines corresponding to levels of the image pyramid.

2. The method according to claim 1, wherein the preprocessing of the image comprises:
first filtering for suppressing noise in the image; and
second filtering for detecting edges in the image.

3. The method according to claim 2, wherein the filters provide a Laplacian of Gaussian function.

4. The method according to claim 1, wherein a bottom level of the levels includes an original resolution of the image.

5. The method according to claim 4, wherein the successively down-scaling of the image is a binary down scaling to a set of $\log_2$ d sub-images for frame-to-frame motion d.

6. A method, comprising:
preprocessing an image for noise suppression and edge detection;
hierarchically decomposing the image to provide an image pyramid;
wherein the hierarchically decomposing includes successively down-scaling the image to provide different resolutions of the image corresponding to levels of the image pyramid;
wherein the image and the different resolutions of the image provide a set of images;
performing a scene analysis of the set of images;
wherein the performing of the scene analysis includes determining variance values for blocks of the set of images;
selecting a subset of the blocks based on variance qualifier values in excess of a variance qualifier threshold providing a subset of variance values;
storing the subset of variance values in association with ones of the set of images corresponding thereto in a frame buffer;
performing motion estimation on the subset of variance values with a plurality of motion estimation engines to determine motion vectors for translation of the blocks corresponding to the subset of variance values in a reference frame to a current frame;
wherein the selecting of the subset of variance values includes first dynamic thresholding of the variance qualifier values;
determining errors associated with the motion vectors with the motion estimation engines; and
second dynamic thresholding responsive to the errors to provide a subset of the motion vectors.

7. The method according to claim 6, wherein the determining of the errors comprises:
determining a first best match error value and a second best match error value; and
generating the errors as metrics of a combination of the first best match error value and the second best match error value for each of the motion vectors.

8. The method according to claim 7, wherein the first best match error value and the second best match error value are respective sums of absolute differences error values.

9. The method according to claim 6, further comprising:
vector processing the subset of the motion vectors to provide global motion vectors for corresponding frames;
filtering the global motion vectors; and
cropping the frames responsive to the global motion vectors to provide stabilized video frames.

10. The method according to claim 9, wherein the vector processing comprises:
processing motion vector spaces of the subset of the motion vectors as two-dimensional ("2D") histograms; and
aggregating the 2D histograms on a frame-by-frame basis.

11. The method according to claim 10, wherein the aggregating comprises:
generating horizontal projections and vertical projections of the motion vectors;
performing correlations on the horizontal projections and the vertical projections to obtain correlation results;
thresholding the correlation results with cross-correlation functions to obtain sets of horizontal and vertical vertices representing translation vectors for video stabilization;
determining minimum errors for the translation vectors; and
selecting from the translation vectors responsive to the minimum errors the global motion vectors.

12. The method according to claim 11, wherein the determining further comprises refining candidate vectors into sub-pixel resolution for selecting between two or more of the translation vectors associated with a same frame of the frames.

13. The method according to claim 11, wherein the filtering of the global motion vectors is motion predictive filtering comprising:
separating a high-frequency from a low-frequency component of a translation vector of the translation vectors; and
feeding back the high-frequency component to update an aggregated histogram of the 2D histograms.

14. The method according to claim 9, wherein the cropping comprises adaptive filtering to provide a cropping position for motion accumulation for a sequence of frames.

15. The method according to claim 14, wherein the adaptive filtering comprises time-variant, progressive, two-dimensional filtering to progressively increase a filter coefficient.

16. The method according to claim 15, wherein the progressive two-dimensional filtering comprises storing in a look-up table predetermined boundary values associated with the cropping position.

17. An apparatus, comprising:
a preprocessing block configured for noise suppression and edge detection of an image;
an image pyramid generator block configured for hierarchical decomposition of the image to provide an image pyramid;
wherein the hierarchical decomposition is a successively down-scaled version of the image to provide different resolutions of the image corresponding to levels of the image pyramid;
wherein the image and the different resolutions of the image provide a set of images;
a scene analysis section configured to perform a scene analysis of the set of images;
wherein the scene analysis section is configured to determine variance values for blocks of the set of images;
wherein the scene analysis section is configured to select a subset of the variance values in excess of a variance qualifier threshold; and a frame buffer coupled to store the subset of the variance values in association with the set of images corresponding thereto.

18. The apparatus according to claim 17, wherein the preprocessing block comprises:
   a Gaussian filter for suppressing noise in the image; and
   a Laplacian filter for detecting edges in the image;
   wherein the preprocessing block provides a Laplacian of Gaussian function.

19. The apparatus according to claim 17, further comprising:
   a plurality of motion estimation engines coupled to receive the subset of variance values to determine motion vectors for translation of the blocks corresponding to the subset of variance values in a reference frame to a current frame;
   wherein the scene analysis section includes a first dynamic thresholding block to select the subset of the variance values in excess of the variance qualifier threshold; and
   wherein the motion estimation engines are configured to determine first best match error values and second best match error values to provide error metrics associated with the motion vectors; and
   wherein the motion estimation engines include second dynamic thresholding blocks coupled to provide a subset of the motion vectors responsive to the error metrics.

20. The apparatus according to claim 19, wherein the first best match error values and the second best match error values are respective sums of absolute differences.

\* \* \* \* \*